(12) United States Patent
Jadidian et al.

(10) Patent No.: US 12,141,340 B2
(45) Date of Patent: Nov. 12, 2024

(54) MUSCLE GROUP MOVEMENT TRACKING USING RF SENSORS

(71) Applicant: Microsoft Technology Licensing, LLC, Redmond, WA (US)

(72) Inventors: Jouya Jadidian, Los Gatos, CA (US); Gabriele D'Amone, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/170,055

(22) Filed: Feb. 16, 2023

(65) Prior Publication Data
US 2024/0281056 A1    Aug. 22, 2024

(51) Int. Cl.
| | |
|---|---|
| *G06T 19/00* | (2011.01) |
| *G02B 3/00* | (2006.01) |
| *G02B 30/40* | (2020.01) |
| *G06F 3/01* | (2006.01) |
| *G06F 3/0488* | (2022.01) |
| *G06F 3/14* | (2006.01) |
| *G06F 3/147* | (2006.01) |
| *G06T 11/00* | (2006.01) |
| *G06T 13/40* | (2011.01) |
| *G09G 3/32* | (2016.01) |

(52) U.S. Cl.
CPC .............. *G06F 3/012* (2013.01); *G02B 3/005* (2013.01); *G02B 30/40* (2020.01); *G06F 3/1423* (2013.01); *G06F 3/147* (2013.01); *G06T 11/00* (2013.01); *G06T 13/40* (2013.01)

(58) Field of Classification Search
CPC .................................................. G02B 27/0172
See application file for complete search history.

(56) References Cited

U.S. PATENT DOCUMENTS

| | | | | |
|---|---|---|---|---|
| 2003/0016444 | A1* | 1/2003 | Brown | H04N 13/305 |
| | | | | 348/E13.043 |
| 2020/0297262 | A1 | 9/2020 | Chappell, III | |
| 2021/0232225 | A1* | 7/2021 | Cipoletta | G06F 1/163 |
| 2021/0335483 | A1* | 10/2021 | Freeman | G02B 21/0012 |
| 2021/0390784 | A1* | 12/2021 | Smith | G09G 3/32 |
| 2022/0201273 | A1* | 6/2022 | Matsuda | H04N 13/383 |

(Continued)

FOREIGN PATENT DOCUMENTS

| | | |
|---|---|---|
| EP | 2896986 B1 | 2/2021 |
| WO | 2021252532 A1 | 12/2021 |

OTHER PUBLICATIONS

International Search Report and Written Opinion received for PCT Application No. PCT/US2024/014911, May 13, 2024, 16 pages.

(Continued)

*Primary Examiner* — Nan-Ying Yang
(74) *Attorney, Agent, or Firm* — Workman Nydegger

(57) ABSTRACT

A head-mounted mixed-reality (MR) device that is wearable by a user is disclosed. The MR device includes a user-facing display that displays user-directed content. The user-directed content is visible from a first position of a user who is wearing the MR device. The MR device further includes an outward-facing display that displays outward-directed content. The outward-directed content is visible from a second position that is external relative to the position of the user who is wearing the MR device.

19 Claims, 19 Drawing Sheets

(56) References Cited

U.S. PATENT DOCUMENTS

2023/0045982 A1* 2/2023 Lapstun ............ G02B 27/0093

OTHER PUBLICATIONS

Li, et al., "Facial performance sensing head-mounted display", ACM Transactions on Graphics (ToG), vol. 34, Issue No. 4, Aug. 2015, pp. 47:1-47:9.
Matsuda, et al., "VR Social copresence with light field displays", ACM Transactions on Graphics (TOG), vol. 40, Issue No. 6, December 202, pp. 244:1-244:13.

* cited by examiner

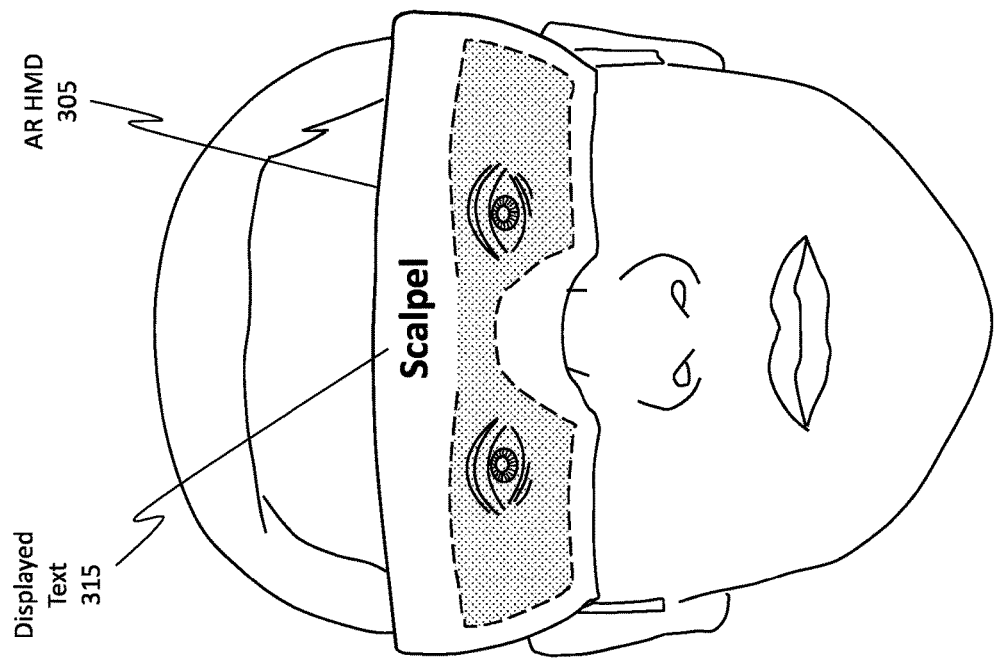
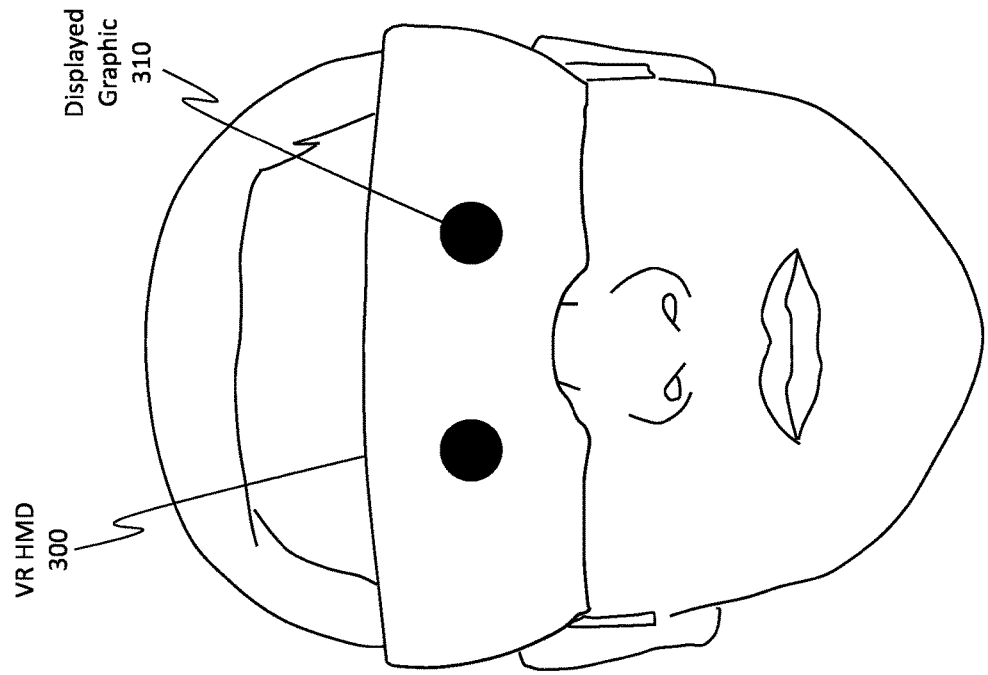
Figure 3

1700

1705 — Display User-Directed Content On A User-Facing Display Of The MR Device, The User-Directed Content Being Visible From A First Position Of A User Who Is Wearing The MR Device 1710 — Display Outward-Directed Content On An Outward-Facing Display Of The MR Device, The Outward-Directed Content Is Visible From A Second Position That Is External Relative To The Position Of The User Who Is Wearing The MR Device

*Figure 17*

MUSCLE GROUP MOVEMENT TRACKING USING RF SENSORS

BACKGROUND

Mixed-reality (MR) systems, which include virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

An MR system can be used to display various different types of information to a user. Some of that information is displayed in the form of augmented reality or virtual reality content, which can also be referred to as a "hologram." That is, as used herein, the term "hologram" generally refers to image content that is displayed by the MR system. In some instances, the hologram can have the appearance of being a three-dimensional (3D) object while in other instances the hologram can have the appearance of being a two-dimensional (2D) object.

MR headsets/HMDs have now become a consumer technology, with the hope that their uniquely immersive display and interaction systems will lead to more compelling entertainment, productivity, and telepresence applications. Yet, little attention has been paid to resolving a core deficiency. That is, MR displays can isolate their users from their environments and, in doing so, may potentially limit MR device usage and acceptance in shared and public spaces. Eliminating this isolation is a key motivation for the development of video "pass through," where the user is provided an image-based reproduction of that user's external environment and the individuals within it. A gap remains, however, in that external viewers or "spectators" cannot hold a natural conversation with an MR headset user, whose upper face and eyes remain occluded. What is needed, therefore, is an improved technique for connecting HMD wearers with spectators.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods that display outward-directed content on an outward-facing display of a mixed-reality (MR) device.

Some embodiments are directed to a head-mounted mixed-reality (MR) device that is wearable by a user. This MR device comprises a user-facing display that displays user-directed content. The user-directed content is visible from a first position of a user who is wearing the MR device. The MR device further includes an outward-facing display that displays outward-directed content. The outward-directed content is visible from a second position that is external relative to the position of the user who is wearing the MR device.

Some embodiments display outward-facing content on a head-mounted mixed-reality (MR) device. For instance, some embodiments access an image file that represents a face of a user who is wearing the MR device. The image file includes a set of coefficients that, if modified, changes an appearance of the user's face as represented by the image file. The embodiments obtain scattering parameter data from a radio frequency (RF) sensor disposed on the MR device. The RF sensor generates a set of scattering parameters that reflect a movement of conductive matter of the user. The conductive matter corresponds to the user's face. The embodiments use the scattering parameters to update the set of coefficients, resulting in a change to the appearance of the user's face as represented by the image file. After the set of coefficients are updated, the embodiments display at least a portion of the image file on an outward-facing display of the MR device. Content displayed on the outward-facing display is visible from a position that is external relative to a position of the user who is wearing the MR device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates examples of content displayed on the outward-facing display.

FIG. 17 illustrates a flowchart of an example method for displaying content on an outward-facing display.

DETAILED DESCRIPTION

Figure 1:
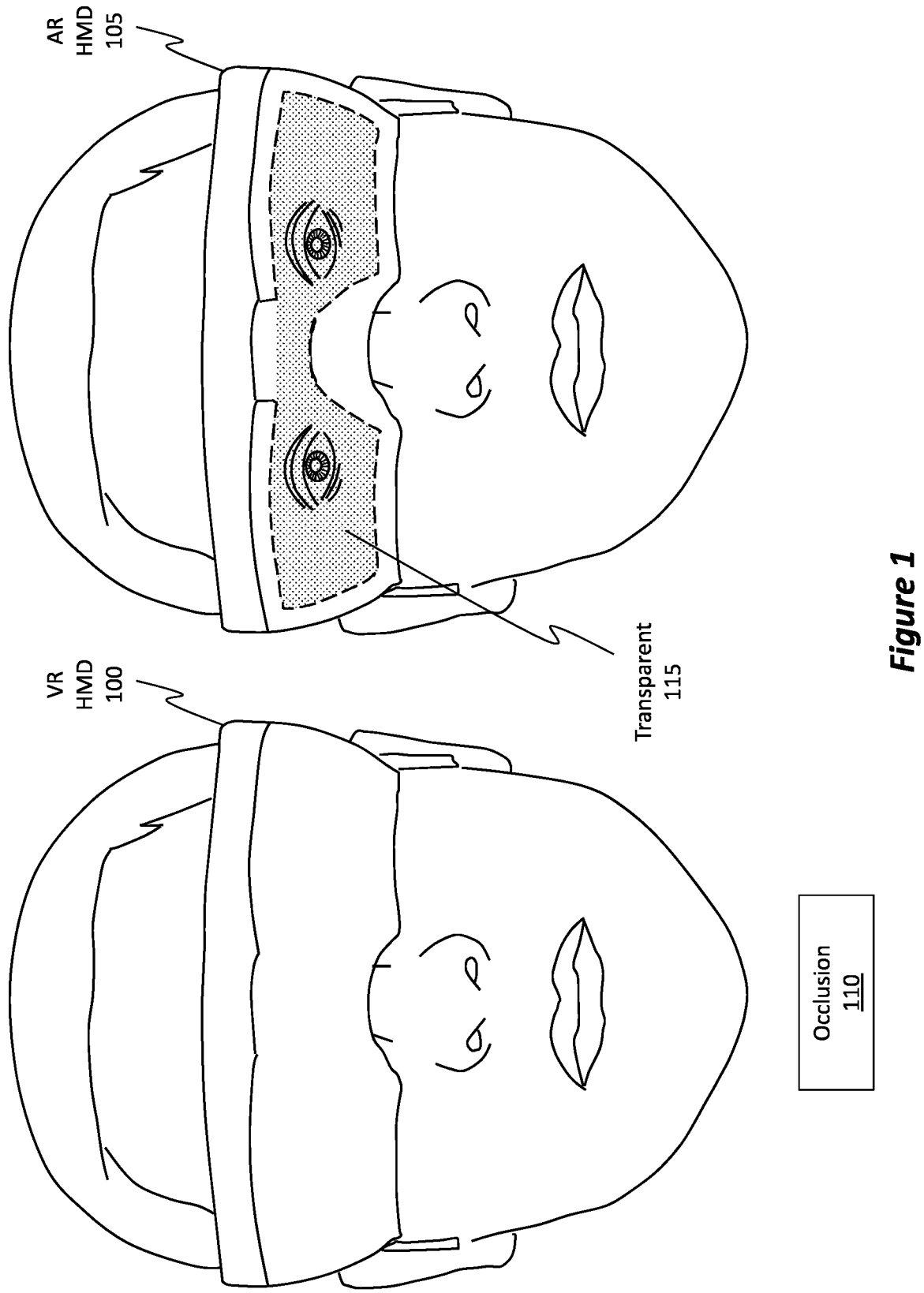
FIG. 1 illustrates various different implementations of a mixed-reality (MR) device, including a virtual-reality (VR) device that occludes at least a majority of the user's view of the real world and an augmented-reality (AR) device that includes a transparent display, thereby enabling the user to view the real world.

Embodiments disclosed herein relate to systems, devices, and methods that display outward-directed content on an outward-facing display of a mixed-reality (MR) device.

Some embodiments are directed to a head-mounted mixed-reality (MR) device that is wearable by a user. This MR device comprises a user-facing display that displays user-directed content. The user-directed content is visible from a first position of a user who is wearing the MR device. The MR device further includes an outward-facing display that displays outward-directed content. The outward-directed content is visible from a second position that is external relative to the position of the user who is wearing the MR device.

Some embodiments display outward-facing content on a head-mounted mixed-reality (MR) device. For instance, some embodiments access an image file that represents a face of a user who is wearing the MR device. The image file includes a set of coefficients that, if modified, changes an appearance of the user's face as represented by the image file. The embodiments obtain scattering parameter data from a radio frequency (RF) sensor disposed on the MR device.

The RF sensor generates a set of scattering parameters that reflect a movement of conductive matter of the user. The conductive matter corresponds to the user's face. The embodiments use the scattering parameters to update the set of coefficients, resulting in a change to the appearance of the user's face as represented by the image file. After the set of coefficients are updated, the embodiments display at least a portion of the image file on an outward-facing display of the MR device. Content displayed on the outward-facing display is visible from a position that is external relative to a position of the user who is wearing the MR device.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments provide numerous benefits, advantages, and practical applications to the technical field of smart, wearable technology. In particular, the embodiments equip an HMD with an outward-facing display that is capable of displaying any type of content. This content is intended to be viewed and potentially interacted with by spectators (i.e. individuals or any entities who are not wearing the HMD that is displaying the content). Thus, this content should be considered as being distinct relative to content that is displayed for the user of the HMD to view and interact with. In one example scenario, the displayed content can accurately reflect not only the user's facial features but also the movement of those facial features. By displaying this content, particularly when a pass through image is provided to the user, spectators are able to better connect with the user wearing the HMD.

Additionally, the disclosed improvements and solutions use radio frequency (RF) face tracking technology that is built into the HMD. This RF technology accurately tracks, in real-time, facial movements and replicates those movements on the outward-facing display, which can optionally be implemented as a lenticular display. Using RF sensing technology enables tracking of facial expressions that cameras cannot capture due to occlusion (such as eyebrows and cheeks) and low light. Compared to the use of cameras, RF sensing is lightweight, low power, low cost, and delivers much richer facial expressions. By combining gaze tracking with RF sensing, the disclosed embodiments can reach an incredibly high level of accuracy and are able to create, in real-time, truly photo-realistic facial expressions and movements.

Example MR Systems And HMDs

Attention will now be directed to FIG. 1, which illustrates an example of a head-mounted mixed-reality (MR) system implemented in two different forms. The head-mounted MR system can also simply be referred to as an MR system, MR device, or a head-mounted device (HMD). In particular, FIG. 1 shows one implementation of the MR system in the form of a virtual-reality (VR) HMD 100. FIG. 1 shows a second implementation of the MR system in the form of an augmented-reality (AR) HMD 105. It should be noted that while a substantial portion of this disclosure is focused on the use of a VR HMD (aka VR device), the embodiments can be implemented using any type of MR device, including VR devices and AR devices.

The VR HMD 100 is shown as being structured so as to either completely or at least mostly occlude the user's view of the real world, as shown by occlusion 110. In contrast, the AR HMD 105 is shown as being structured with a display that enables the user to view the real world. For instance, the display can be transparent 115, thereby enabling the user to see the real world through the display.

Figure 2:
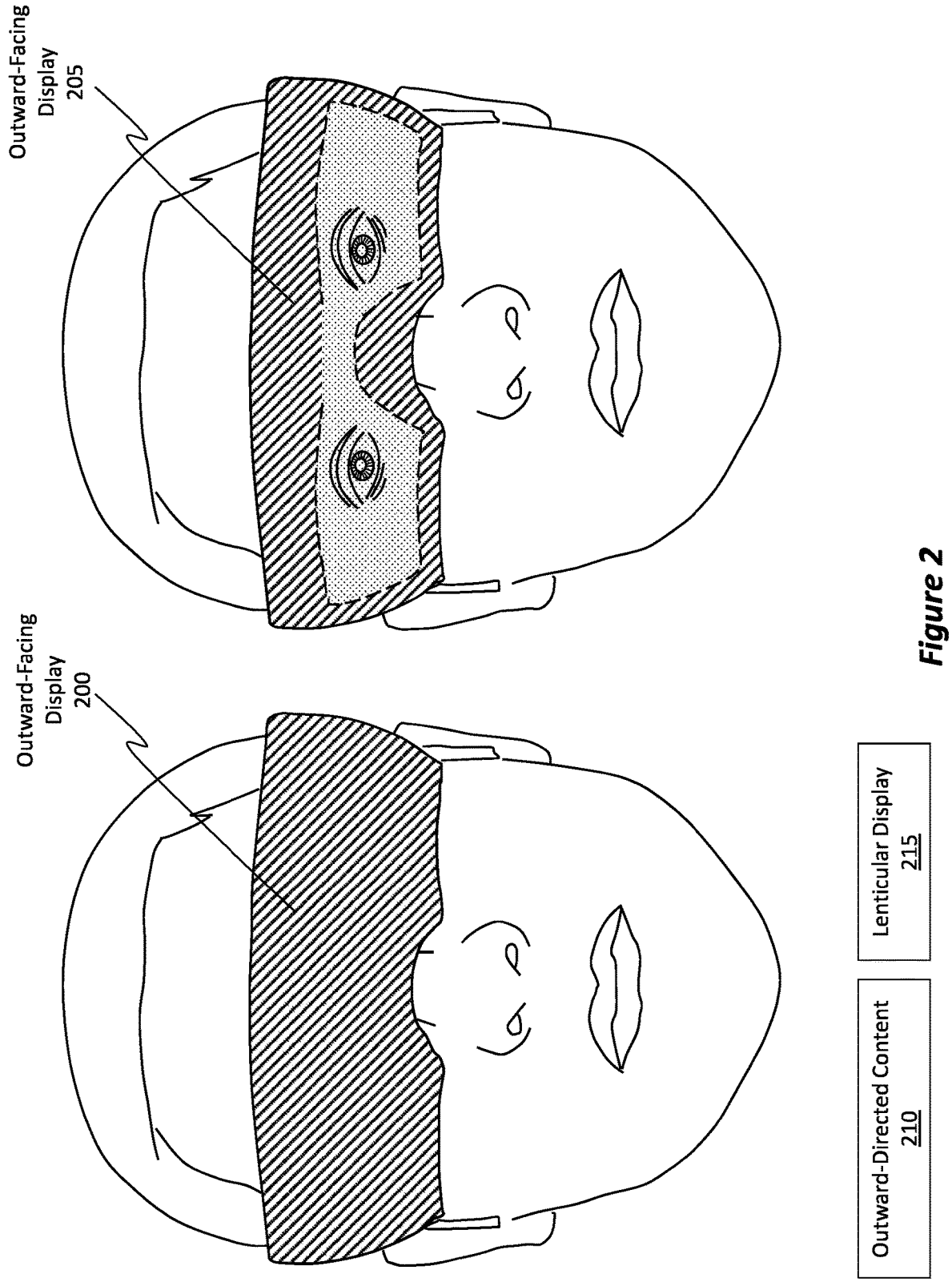
FIG. 2 illustrates how, in accordance with the disclosed principles, an MR device can now be equipped with an outward-facing display, which is configured to display content for view by spectators who are located remotely relative to the MR device.

As reflected in FIG. 2, the disclosed embodiments provide various improvements to how an MR device is now structured. In particular, the embodiments now equip an outward-facing display on a portion of the MR system, as reflected by the outward-facing display 200 and 205.

The outward-facing display 200 is shown as being disposed on a VR device while the outward-facing display 205 is shown as being disposed on an AR device. In both of these scenarios, the outward-facing displays are disposed on a front-facing side of the HMD. In some embodiments, the outward-facing display can additionally be disposed on the side portions and/or the rear portion of the HMD. In some cases, the outward-facing display can be a type of wrap around display that starts on one side of the HMD, continues on the front-facing side of the HMD, and ends on the opposite side of the HMD. In some cases, even the back-facing side of the HMD can include a display or can be a part of the wrap around display.

The outward-facing display can include multiple discrete displays, each of which may be configured to display different content. For instance, in one example scenario, the HMD may include four separate outward-facing displays; namely, a first display on a first side of the HMD, a second display on the front-facing side of the HMD, a third display on the second side of the HMD, and a fourth display on the back-facing side of the HMD.

Notice, in the example shown in FIG. 2, the "real estate" that is available to house the outward-facing display is larger for the VR device than it is for the AR device. Such is the case because the AR device requires a transparent display for the user to look through whereas the VR device is structured to completely or at least partially occlude the user's view of the real world, resulting in more available space to house the outward-facing display.

The outward-facing display of the HMD is structured to display any type of outward-directed content 210. This content can be of any form and can be displayed in any manner. Various examples of such content will be provided shortly. It is typically the case that the outward-directed content 210 displayed on the outward-facing display is not readily observable by the user wearing the MR device. That is to say, the outward-directed content 210 is not content primarily designed for the user to view and interact with; rather, it is designed primarily for external viewers or spectators who may be looking at the user to view and potentially interact with. Thus, the outward-directed content 210 should be distinguished from content that is specifically displayed for the user to view and interact with, such as holograms and other imagery visualized in a scene provided for the user.

It should also be noted that it is not strictly the case that the user cannot observe the outward-directed content 210. For instance, depending on how the user is wearing the HMD and/or how the outward-facing display is structured and/or where on the outward-facing display the outward-directed content is displayed, it may be the case that the user can view and potentially interact with the outward-directed content 210. That being said, it is typically the case that the outward-directed content 210 (i.e. any content displayed on the outward-facing display) is intended for viewing and/or interaction by an entity that is not wearing the HMD.

In some implementations, as will be discussed in more detail later, the outward-facing display can also be or include a type of lenticular display 215. A lenticular display is a type of display that provides the illusion of depth for content that is visualized in the display. The lenticular display also enables the visualization of the content in a manner so as to give it the appearance that the content moves when viewed from different angles. In some cases, the outward-facing display can also be a touch screen type of display.

FIG. 3 shows an example VR HMD 300 and an example AR HMD 305, with each having its own corresponding outward-facing display. In the example shown in FIG. 3, the VR HMD 300 is currently displaying a graphic on the outward-facing display, as shown by displayed graphic 310. Of course, any type or any complexity of graphic can be displayed. In this example scenario, the displayed graphic 310 is a simplified graphic that reflects an eye position of the user's eyes. Other, more detailed graphics can also be displayed, even graphics that are not related to the user's body.

FIG. 3 shows how the AR HMD 305 is currently displaying text on the outward-facing display, as shown by displayed text 315. Displaying text or even images can be beneficial for a number of reasons. For instance, consider a scenario where a surgeon is operating on a patient, and the surgeon is wearing the AR HMD 305. The AR HMD 305 may be tracking the surgeon's movements and may determine that the surgeon will likely need a particular tool, such as a scalpel. The AR HMD 305 can display the requested item in the form of text so that the surgeon's assistants can provide the surgeon with the scalpel without the surgeon even having to verbally ask for it. Thus, in some cases, displaying the outward-directed content can be triggered based on instructions provided from a machine learning engine or perhaps instructions provided by some entity other than the user.

Figure 4:
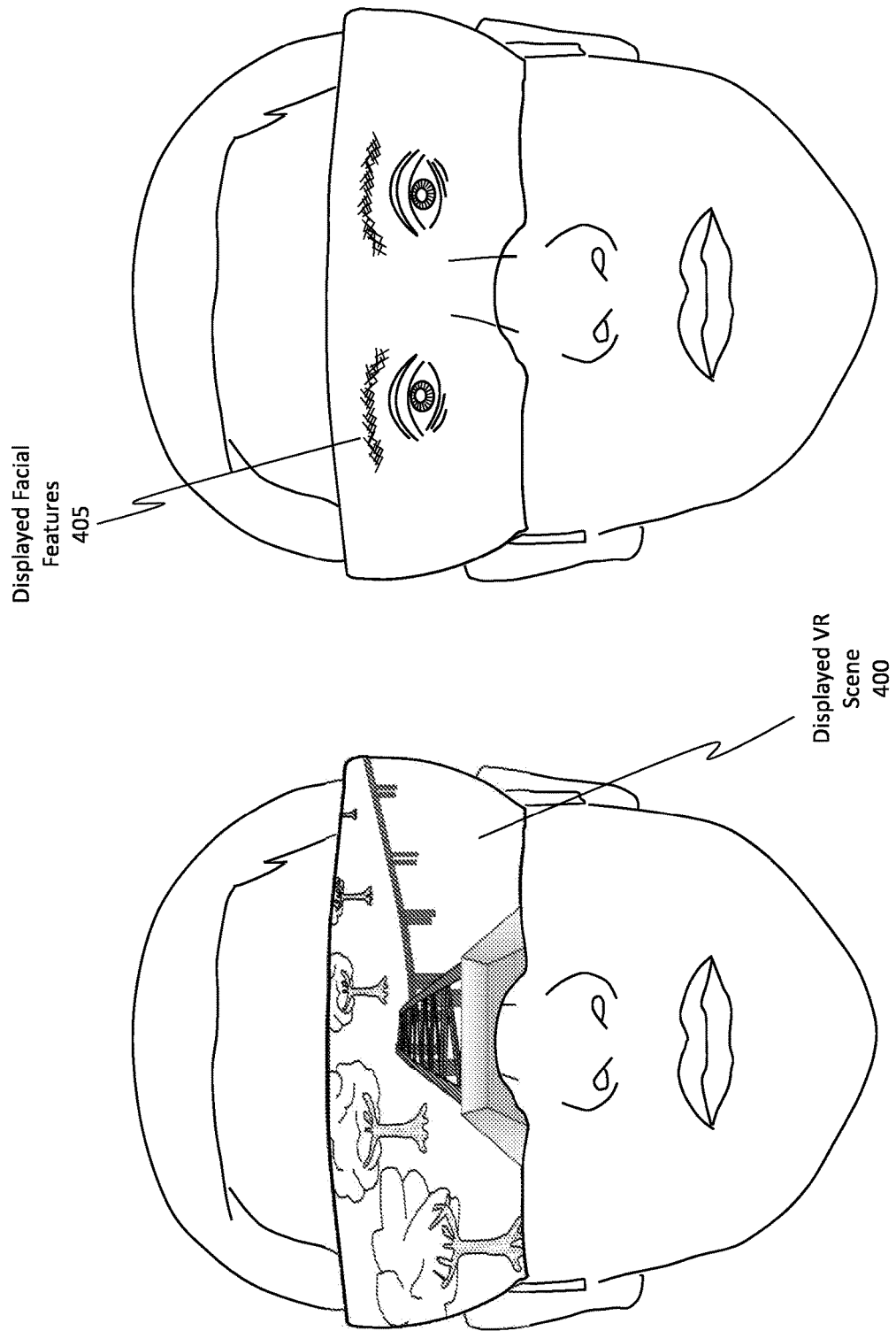
FIG. 4 illustrates more examples of content displayed on the outward-facing display.

FIG. 4 shows two other examples of displayed content. In one scenario, a portion of the MR content that is being displayed to the user can also optionally be displayed on the outward-facing display, as shown by the displayed VR scene 400. In doing so, the spectators can thus observe at least some of the same scene that the user is observing.

In another scenario, a more detailed representation of the user's facial features can be displayed on the outward-facing display, as shown by the displayed facial features 405. As will be described in more detail later, the displayed facial features 405 can be updated in real time to reflect actual movements of the user's face so those movements are visualized for others to view.

Such a scenario is particularly beneficial when the MR HMD is displaying a pass through visualization for the user. As used herein, a "pass through" visualization refers to a visualization that mimics what the user wearing the HMD would see if the user were not actually wearing the HMD.

The pass through visualization is generated using the HMD's cameras, which can obtain imagery of the user's environment. Those images are then projected from a first pose or perspective to a new pose or perspective that corresponds to the user's pose or perspective. When a pass through visualization is being displayed, the user is observing images corresponding to the real world and thus is likely to be interacting with the real world, including perhaps interactions with spectators. By displaying the user's facial features in the outward-facing display, the spectators experience with the user will be enhanced because they will be able to observe how the user responds to the interactions.

Lenticular Display

In some embodiments, the outward-facing display of the MR device (e.g., outward-facing display 200 of FIG. 2) can be structured as being or as including a lenticular display. In some embodiments, an entirety of the outward-facing display includes a lenticular display. In other embodiments, only a portion of the outward-facing display includes a lenticular display. In some cases, multiple different lenticular displays can be used.

As one example, suppose the outward-facing display included a display region for the front-facing side of the HMD, for a first side portion of the HMD, for a second side portion of the HMD, and for the rear side of the HMD. In some cases, one or more of these portions can be structured to include a lenticular display. In some cases, all of those portions can include a corresponding lenticular display. In a scenario where the outward-facing display is a single display that wraps around the HMD, the lenticular display can also be a single display that wraps around the HMD, or at least a portion thereof.

As understood herein, a "lenticular display" is a type of display that includes a lens portion disposed on a set of pixels. The combination of the pixels and the lens produces an illusion of depth when the pixels are used to display content. Additionally, or alternatively, the combination of the pixels and the lens provides for the ability to display content as if that content was moving or had the ability to move when viewed from different angles or perspectives. FIGS. 5, 6, 7, and 8 are illustrative.

Figure 5:
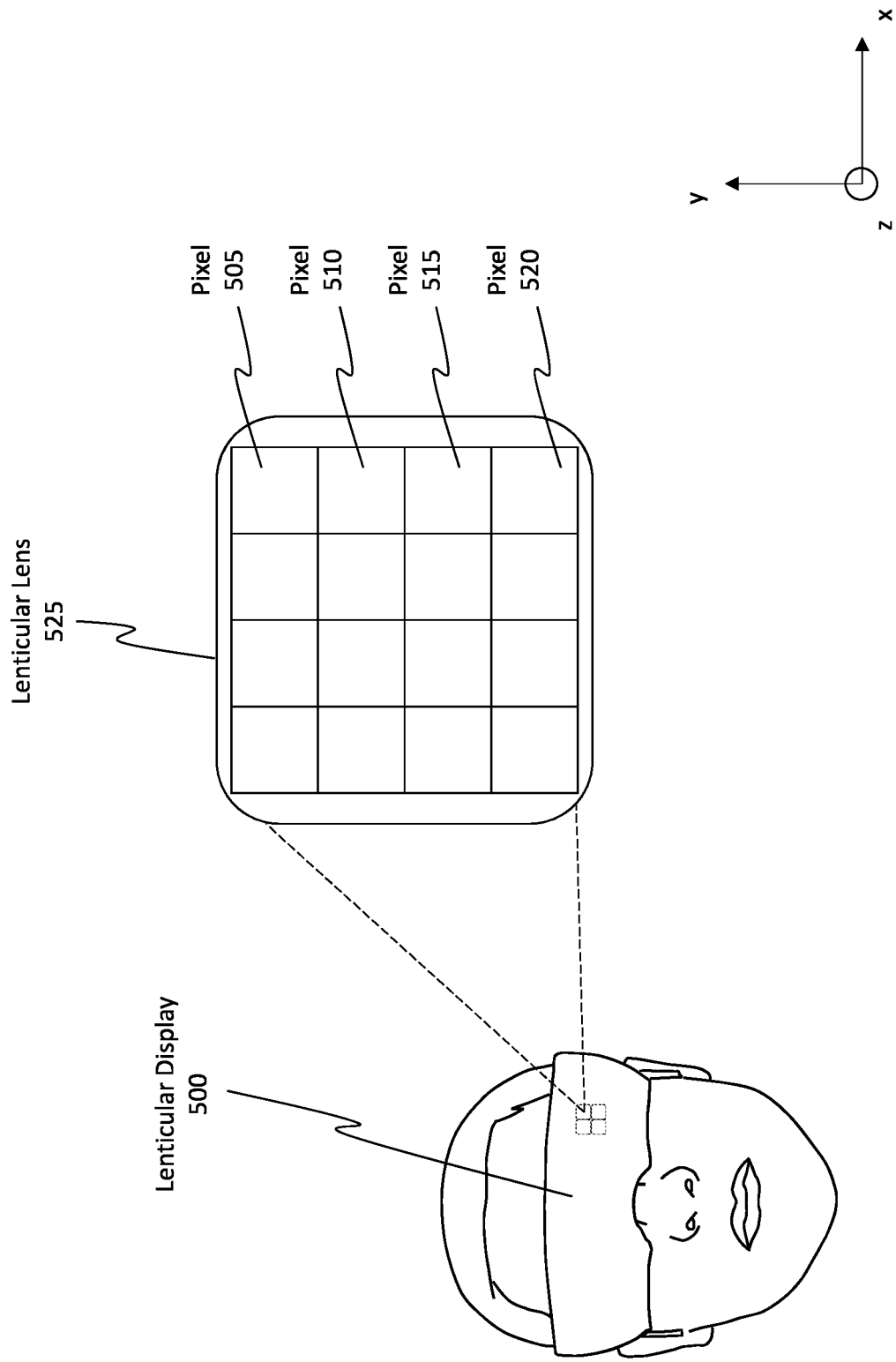
FIG. 5 illustrates one example of how the outward-facing display can be implemented, where the implementation involves the use of a lenticular display.

FIG. 5 shows a lenticular display 500 that is included as at least a part of the outward-facing display. The lenticular display 500 includes any number of pixels, as represented by the square illustrations, some of which are labeled (e.g., pixel 505, 510, 515, and 520). The pixels 505-520 are controlled to display any type of content, such as the outward-directed content 210 from FIG. 2.

Disposed on top of the pixels are one or more lenticular lenses, as shown by lenticular lens 525. The lenticular lens 525 can be considered as being an array of lenses that are designed to reveal different portions of an image (generated by the pixels) when viewed from different angles.

FIG. 5 is currently showing a scenario involving a 4×4 matrix of pixels per singular lenticular lens. One will appreciate how any number of different pixels can be associated with a lenticular lens. For instance, a single lenticular lens can be associated with a 2×2 array of pixels, a 3×3 array, a 5×5 array, a 6×6 array, and so on. In some cases, the array of pixels need not be shaped as a square. For instance, the array can include 2×3 pixels, 2×4 pixels, or any other combination of pixels. Each grouping or matrix of pixels can be grouped with its own corresponding lenticular lens. Thus, the outward-facing display can include multiple different groupings of pixels, where each grouping has its own corresponding lenticular lens. Consequently, the outward-facing display can include multiple different lenticular lenses.

Figure 6:
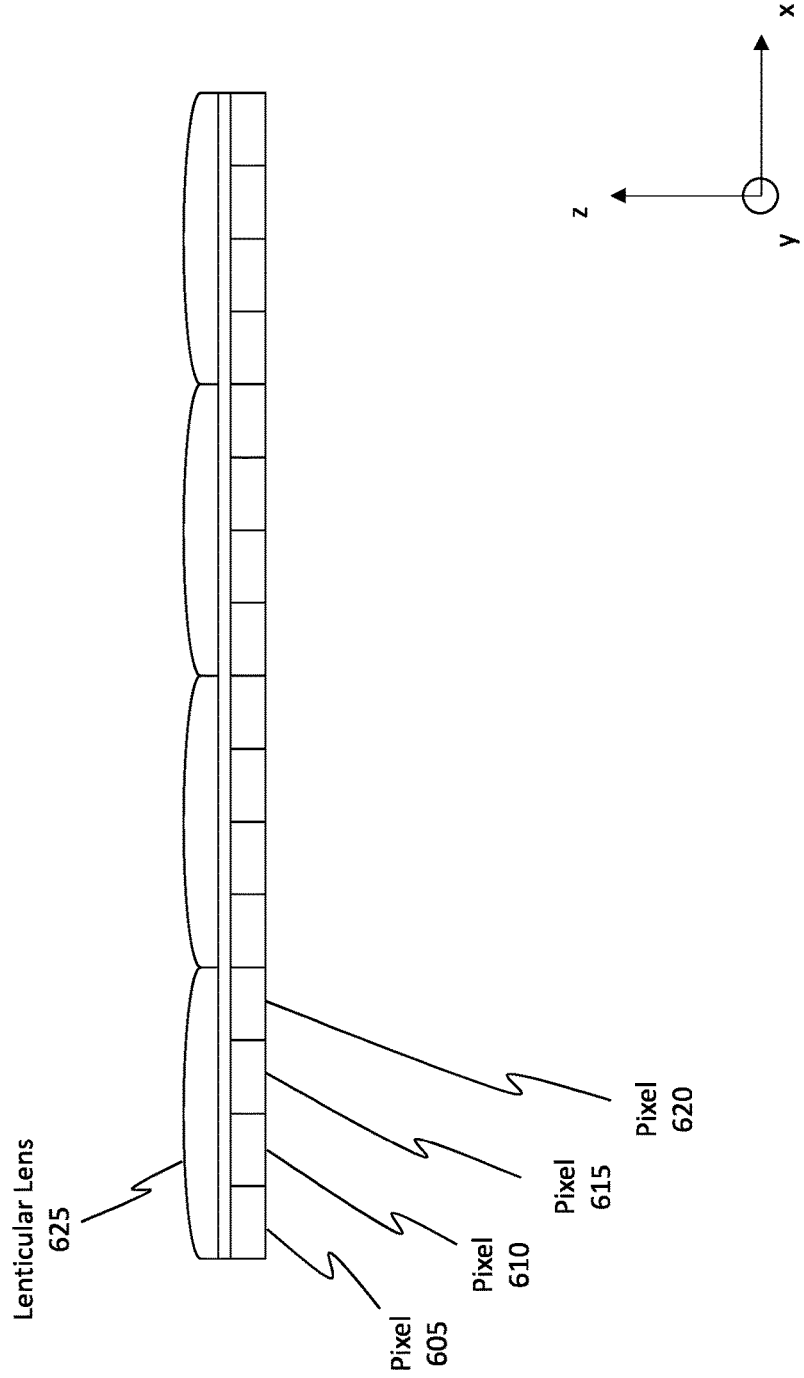
FIG. 6 illustrates various characteristics of the lenticular display.

FIG. 6 shows another view of the lenticular display 600, which is representative of the lenticular displays mentioned thus far. The rectangles are provided to represent pixels, such as pixels 605, 610, 615, and 620. Disposed over top of the pixels 605-620 is a lenticular lens 625. FIG. 6 shows other groupings of pixels (not labeled) and other lenticular lenses (also not labeled).

Figure 7:
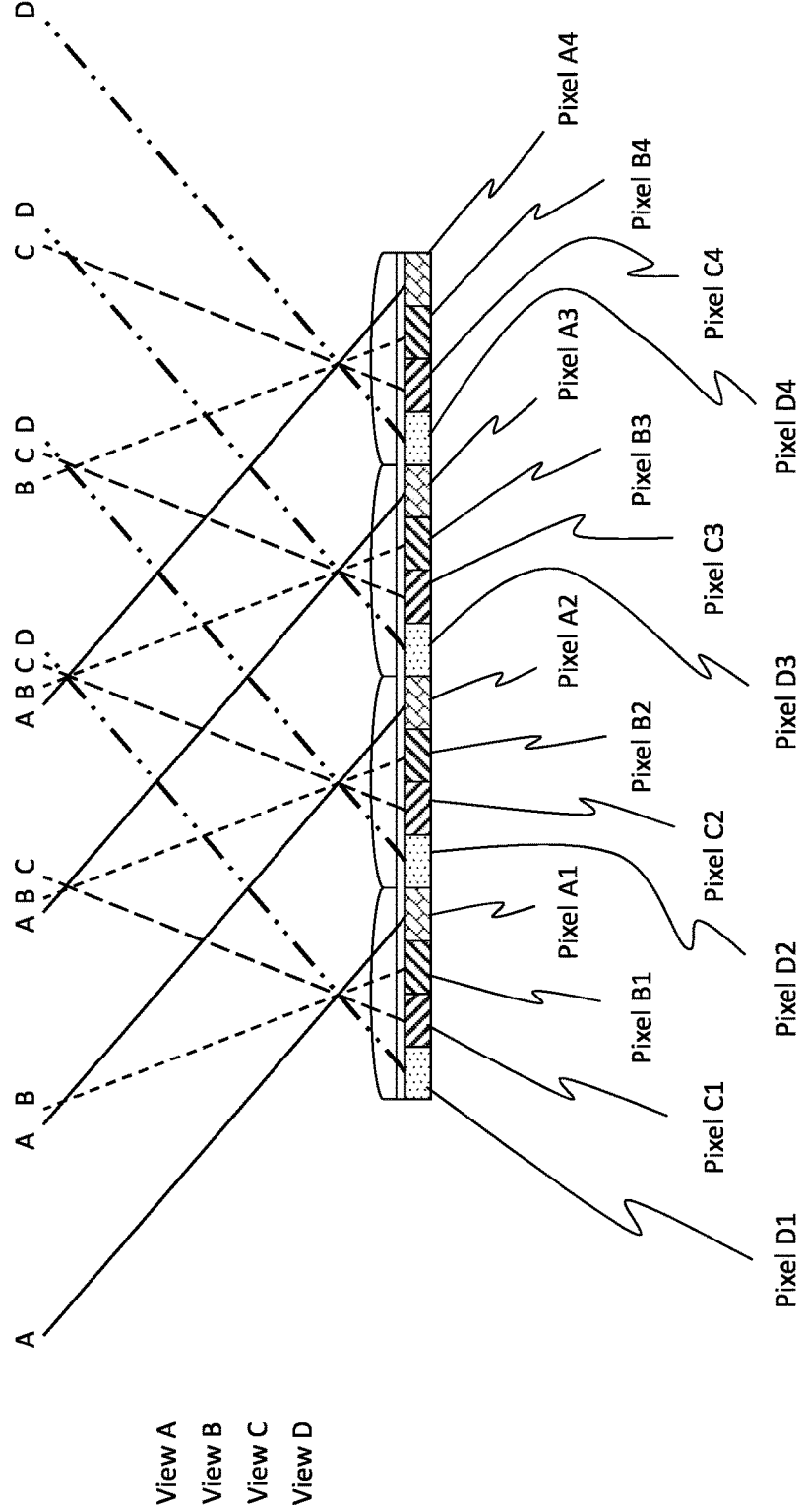
FIG. 7 illustrates additional characteristics of the lenticular display.

FIG. 7 shows a lenticular display 700 that is representative of the lenticular lenses mentioned thus far. As discussed previously, the lenticular display 700 is structured to provide an illusion of depth and/or an illusion of different perspectives of an image when viewed from afar at different angles. For instance, FIG. 7 shows four different viewpoints, as labeled by view A, view B, view C, and view D. The pixels A1, A2, A3, and A4 provide an image that can be viewed from view A. The pixels B1, B2, B3, and B4 provide an image that can be viewed from view B. The pixels C1, C2, C3, and C4 provide an image that can be viewed from view C. Finally, the pixels D1, D2, D3, and D4 provide an image that can be viewed from view D.

Stated differently, when a person is viewing the lenticular display 700 from an angle corresponding to the view A, then the person will observe one version of an image displayed by the underlying pixels (e.g., pixels A1, A2, A3, and A4). When a person is viewing the lenticular display 700 from an angle corresponding to the view B, then the person will observe one version of an image displayed by the underlying pixels (e.g., pixels B1, B2, B3, and B4). When a person is viewing the lenticular display 700 from an angle corresponding to the view C, then the person will observe one version of an image displayed by the underlying pixels (e.g., pixels C1, C2, C3, and C4). when a person is viewing the lenticular display 700 from an angle corresponding to the view D, then the person will observe one version of an image displayed by the underlying pixels (e.g., pixels D1, D2, D3, and D4).

Figure 8:
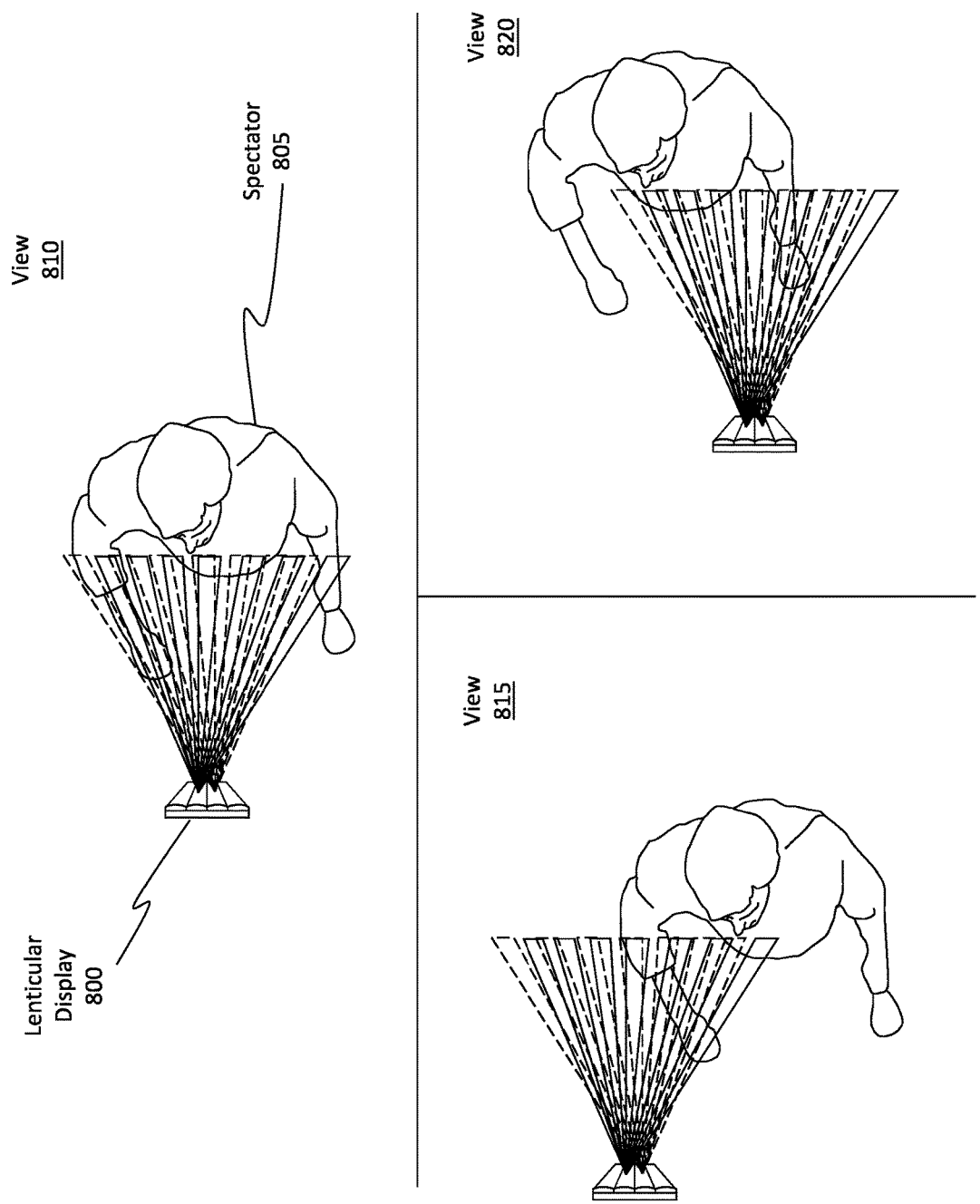
FIG. 8 illustrates different views that can be observed via use of the lenticular display.

FIG. 8 shows another lenticular display 800 and a spectator 805 looking at that display. Currently, the spectator 805 is located at a first position relative to the lenticular display 800. As a result of being at this first position, the spectator 805 will be able to see a first view 810 that is generated by a particular set of pixels included in the lenticular display 800. When the spectator 805 moves to a different position, the spectator 805 will be able to see different views of an image, as shown by view 815 and view 820.

Although the above examples are focused on scenarios where different versions of an image can be displayed based on a spectator's horizontal position relative to a lenticular display, it should be noted how different versions of an image can also be displayed when the spectator is at different vertical positions relative to the display. For instance, if the spectator were to kneel on his/her knee, then the spectator may be presented with a different view as compared to viewing the outward-facing display from a standing position. The array of pixels provides for this change in view. It should also be noted how the pixels can be caused to display entirely different, unrelated images as opposed to different perspectives of a common or related image. For instance, it may be the case that the spectator 805 is viewing a first image at view 810. When at view 815, the spectator 805 may be presented with an entirely different image, not one that is simply a different view or perspective of the image displayed at view 810.

Accordingly, the disclosed embodiments include an outward-facing display on an HMD. This outward-facing display might, in some scenarios, be at least partially visible to the person wearing the HMD. Regardless, it is typically the case that the content displayed by the outward-facing display is intended for view by external persons who are not wearing the HMD. The outward-facing display can display any type of content, including two-dimensional (2D) content or content that appears as if it has three-dimensional (3D) properties. In some cases, the outward-facing display can include a lenticular display, resulting in the option for displaying different content to spectators based on the position of those spectators relative to the HMD and relative to the outward-facing display.

In some cases, the embodiments may refrain from displaying content on the outward-facing display until the HMD detects the presence of a spectator. If not spectator is detected, then the embodiments may not display content. Once a spectator is detected, then content can be displayed.

In some cases, different content may be displayed based on the identification of the spectator.

Example Architecture

Figure 9:
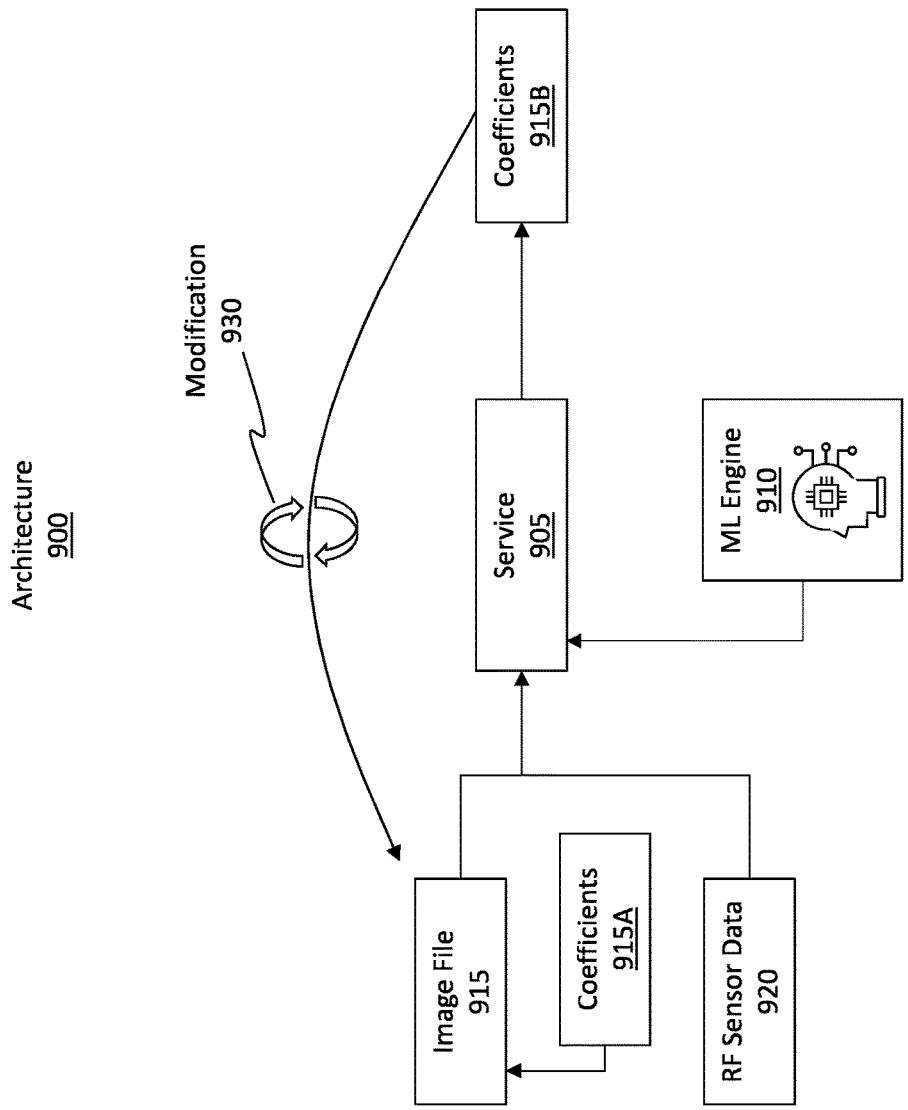
FIG. 9 illustrates an example architecture that can be used to display content on the outward-facing display.

Attention will now be directed to FIG. 9, which illustrates an example architecture 900 that can be used to display specific content on the outward-facing display mentioned previously. That is, the architecture 900 can optionally be implemented on the MR devices mentioned earlier. Architecture 900 includes a service 905. As used herein, the term service refers to a programming construct that is designed to perform specific, automated tasks. In some cases, service 905 can be implemented in a cloud environment such that service 905 is a cloud-based service. In some cases, service 905 can be implemented locally on a device, such as the HMD. In some cases, service 905 can be a hybrid service that includes a cloud-based component and a local component.

Service 905 can optionally include a machine learning (ML) engine 910 or any form of artificial intelligence engine. As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some embodiments, the service 905 is generally tasked with displaying certain content on the outward-facing display of the HMD. More specifically, the service 905 can be tasked with displaying an image that corresponds to the facial features of the user who is wearing the HMD. Additionally, the service 905 can modify the image based on the user's facial movements. As a consequence of performing such actions, spectators (i.e. individuals who are not wearing the MR device) can view the outward-facing display and see how the user is reacting based on the displayed and observed facial feature movements.

To facilitate such operations, the service 905 generates or accesses an image file 915. An example of the image file 915 can optionally be a computer-aided design (CAD) file. The image file 915 includes any number of coefficients 915A. Modification of these coefficients 915A results in a modification to the visualization of the image file 915. As an example, the image file 915 may include a detailed representation of the user's face. The coefficients 915A reflect various properties and characteristics with regard to how the user's face is portrayed or rendered in the image file 915. In one scenario, a set of coefficients may correspond to the user's mouth.

Initially, the image file 915 may correspond to a resting pose of the user, where a "resting pose" is a pose that can be thought of as a default pose or an initial baseline pose of the user. The resting pose may portray the user as not smiling. Modifying the mouth coefficients can result in the image file 915 being modified to reflect a version of the user's face where the user is now smiling. Thus, modifying a select set of the coefficients 915A can result in changes to how the user's face is visualized in the image file 915.

Figure 10:
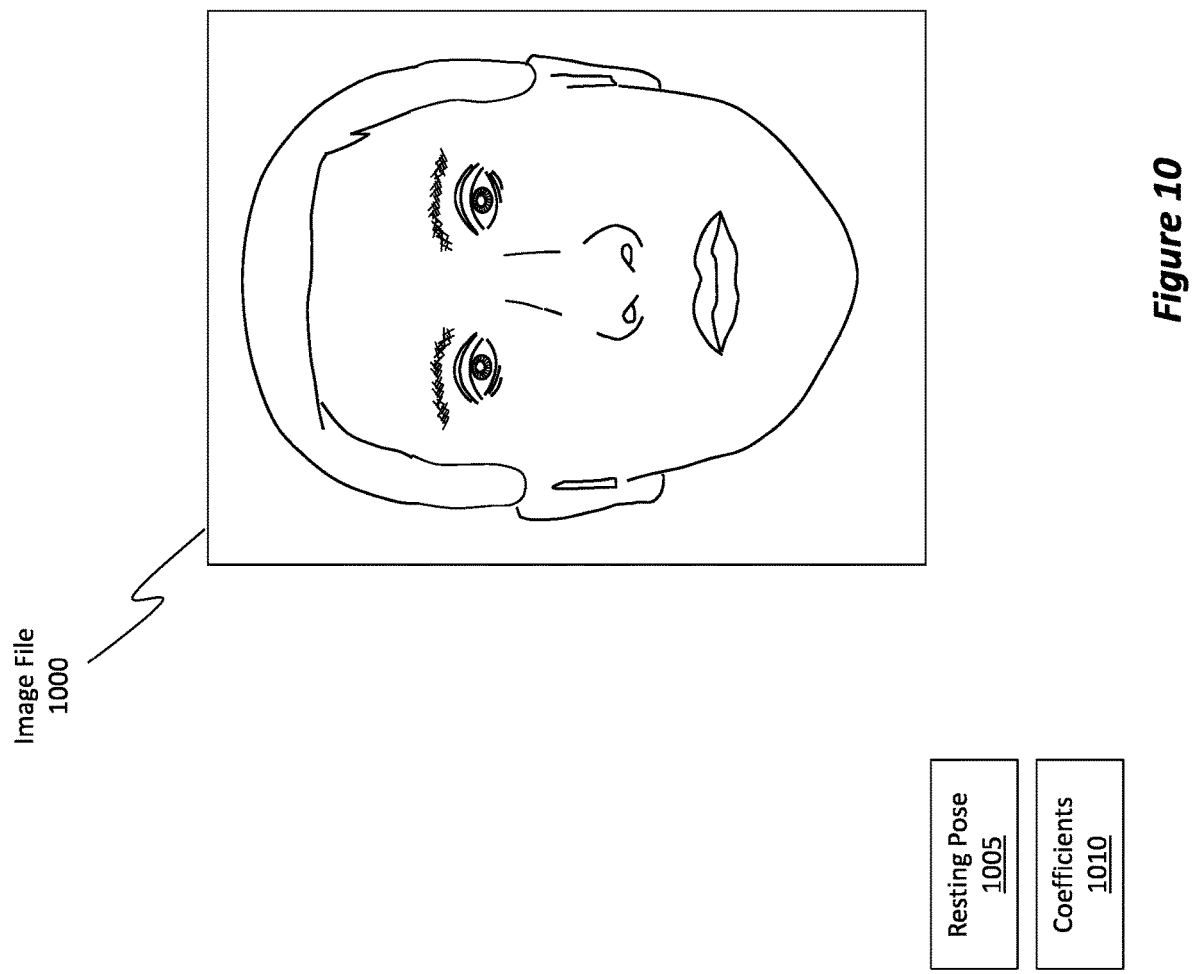
FIG. 10 illustrates an example of an image file (e.g., a computer-aided design (CAD) file) that corresponds to the user's face.

Turning briefly to FIG. 10, this Figure shows an example image file 1000 that is representative of the image file 915 from FIG. 9. The image file 1000 currently represents the user's face while in a resting pose 1005. The image file 1000 includes or is associated with a set of coefficients 1010. Modification of these coefficients 1010 results in modification as to how the user's face is visualized in the image file 1000.

Figure 11:
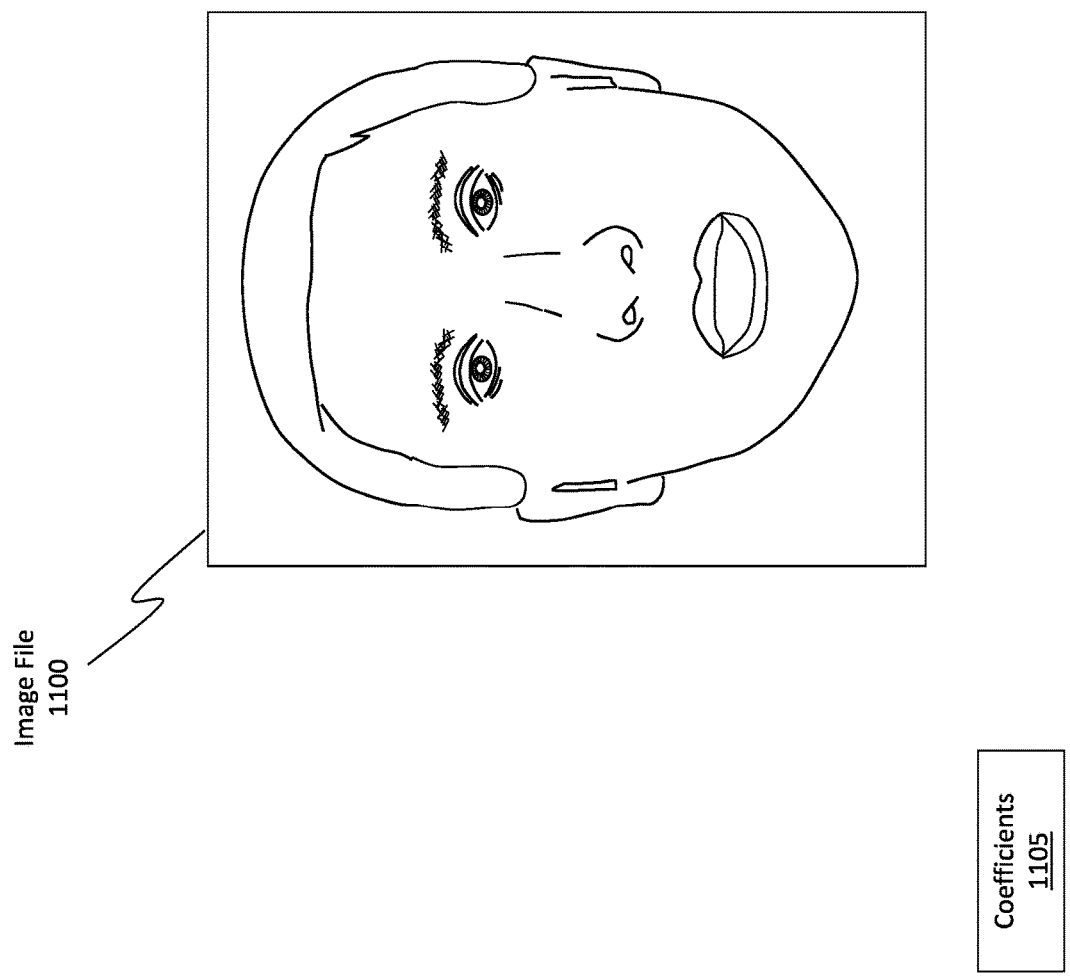
FIG. 11 illustrates how the image file can change based on modifications to the image file's coefficients.

For instance, FIG. 11 shows a modified version of an image file 1100, which is representative of the image file 1000 from FIG. 10. Here, a particular set of coefficients 1105 (i.e. those related to the user's mouth) have been modified, resulting in a change to the appearance of the user's face in the image file 1100. Whereas in FIG. 10, the user's face reflected no expression, in FIG. 11, the user's face now reflects an open mouth. The embodiments are able to modify the coefficients of the image file without relying on subsequently obtained image data, such as from a camera. Instead, the embodiments use sensor data obtained from one or more radio frequency (RF) sensors, as shown in FIG. 9.

That is, FIG. 9 shows how the service 905 is able to obtain or access RF sensor data 920. The RF sensor data 920 is generated by a set of RF sensors that are disposed on the MR HMD. As will be discussed in more detail shortly, the RF sensor data 920 includes a set of scattering parameter data. The service 905 uses the RF sensor data 920 to generate a modified version of the image file's coefficients, as shown by coefficients 915B. These coefficients 915B are then used to modify the image file 915, as shown by modification 930. All or at least a portion of the modified image file can then be displayed on the outward-facing display.

RF Sensors

Figure 12:
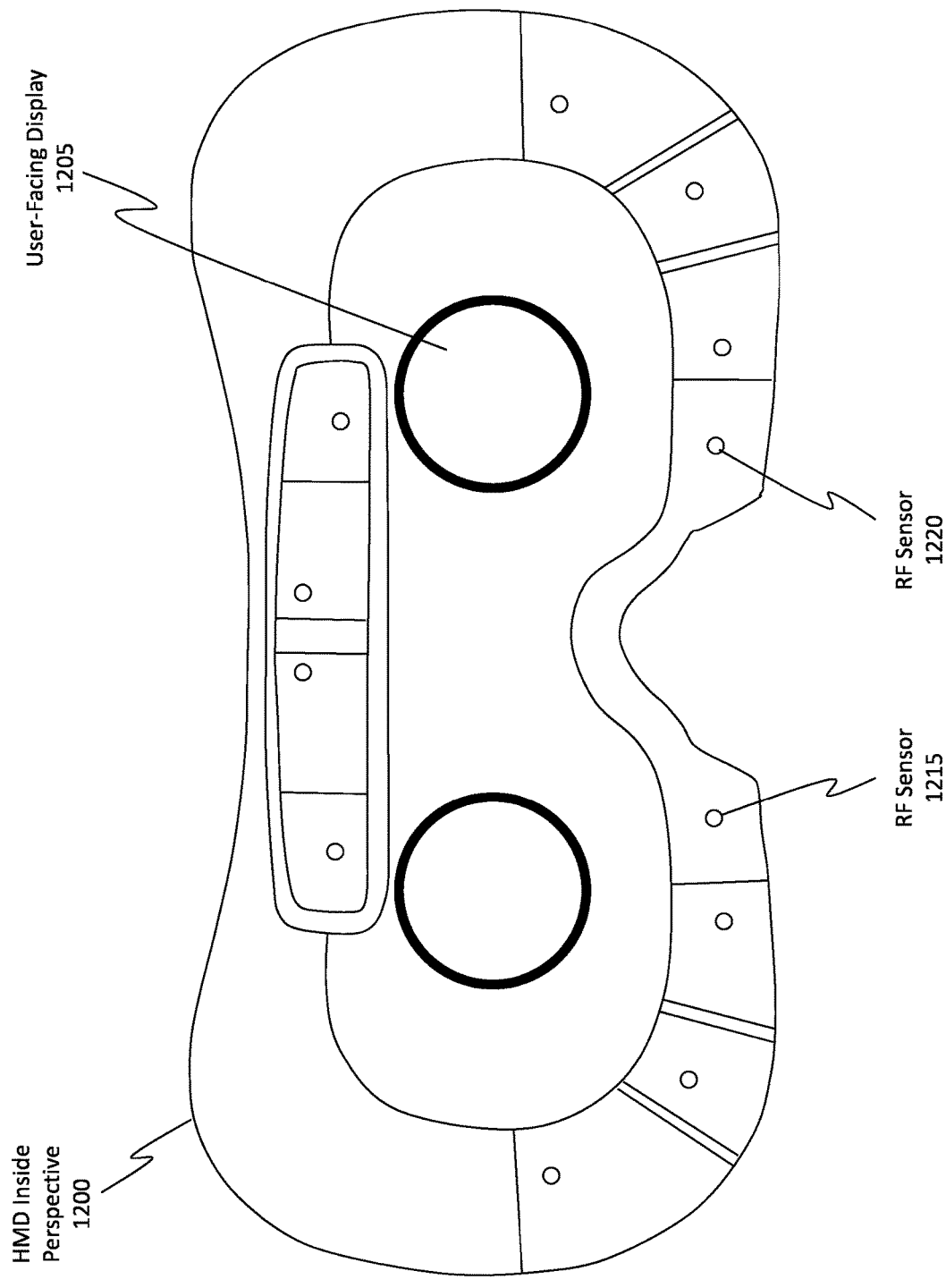
FIG. 12 illustrates how the MR device can be equipped with any number of radio frequency (RF) sensors to measure displacement of certain conductive material (e.g., salty liquid in the user's body).

FIG. 12 shows a perspective view of an MR HMD. In particular, FIG. 12 shows an HMD inside perspective 1200 (i.e. a view the wearer would see when the wearer puts the HMD on). The HMD includes at least one (though often more than one, such as at least two) user-facing displays, as shown by user-facing display 1205. The user-facing display 1205 displays user-directed content 1210, which is content intended for the user to view and potentially interact with. Thus, the user-directed content 1210 should be viewed as being distinct and different relative to the outward-directed content 210 of FIG. 2, where the outward-directed content 210 is intended for view and potential interaction by spectators (i.e. individuals who are not wearing the HMD).

FIG. 12 further shows how the HMD includes any number of RF sensors (e.g., represented by the small circles), two of which are labeled as RF sensor 1215 and RF sensor 1220. The RF sensors are positioned around the face gasket or the chassis of the HMD. From these RF sensors, the service is able to understand facial movements and displacements of the user's face.

The RF sensors are disposed on pads around the HMD. The RF sensors operate in the near field region or the midfield region. In effect, the RF sensors operate as a type of resonator. The RF sensors are caused to oscillate at a specific frequency. Notably, the selected frequency can be any frequency. If multiple HMDs are operating near one another, the RF sensors for each HMD can be caused to oscillate at a different frequency so as to not interfere with one another. Examples of such frequencies include, but certainly are not limited to one megahertz, one gigahertz, or any other selected frequency.

The RF sensors also do not necessarily need to contact the user's face. The RF sensors can sit a distance from the user's face. For example, in the AR scenario, the RF sensors can be at a distance of about one inch from the user's face. Sometimes, the RF sensors are between about 0.5 inches to 1.5 inches away from the user's face. In the VR scenario, the RF sensors can be a few (e.g., 1-10) millimeters away from the user's face. The distance that is created by the gap does not strictly matter because the distance constitutes an impedance between the RF sensors and the user's face. It is also desirable that the RF sensors be grounded or assumed to be grounded via contact of the HMD with the user's body.

Figure 13:
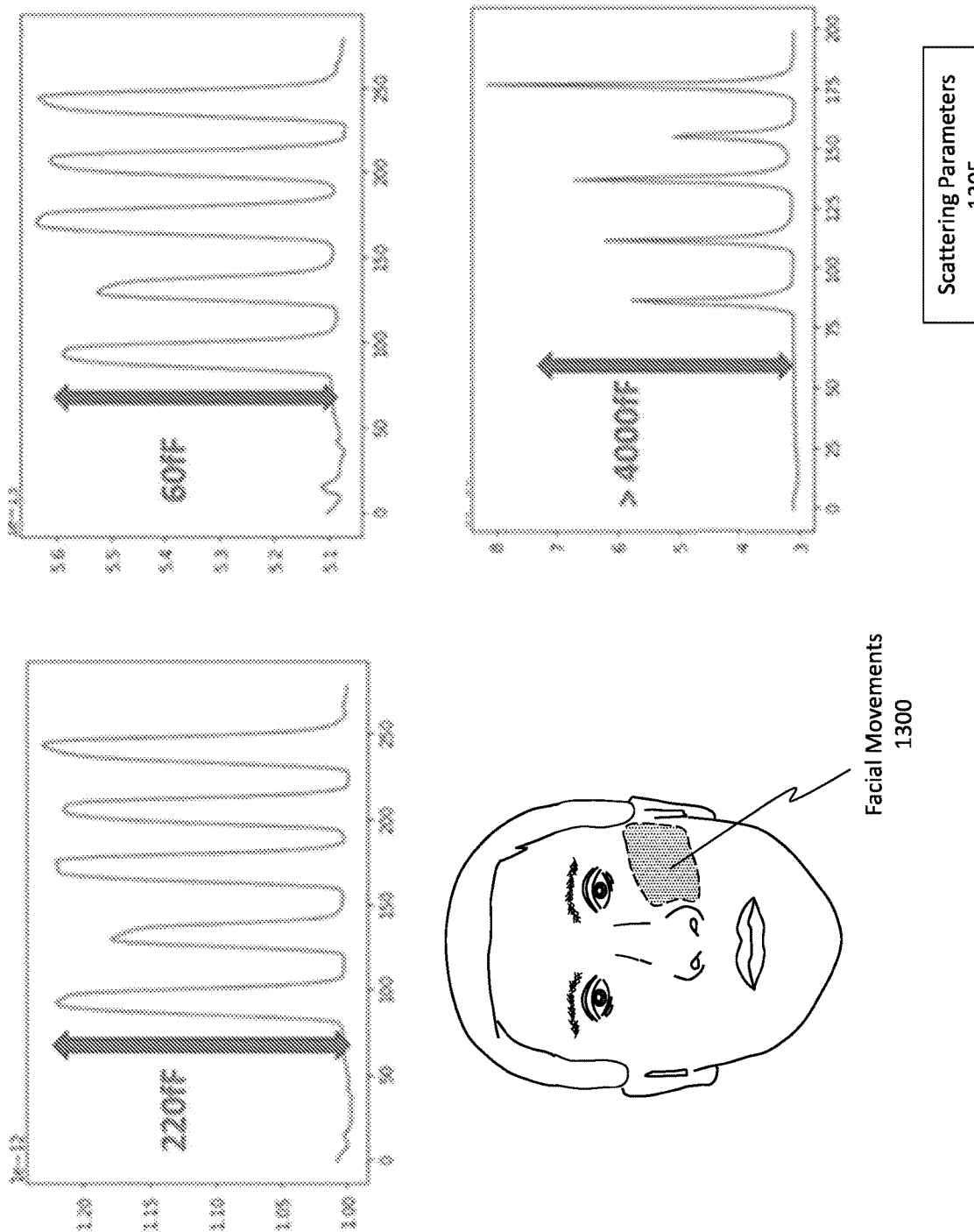
FIG. 13 illustrates a waveform response that is generated from scattering parameter data obtained from the RF sensors.

When the user's face moves relative to the RF sensors (e.g., either towards them or away from them), a different signal will be generated by the RF sensors. For instance, the signal will either go up or down depending on the direction of the facial movement. In this manner, the embodiments are directed to various RF sensors that are tuned to be resonating at a selected frequency. When the user is at the resting pose, the RF sensors will not resonate. As soon as the user's face moves, the signal moves either towards resonance or away from resonance. It should also be noted how the parameters of the circuit (i.e. scattering parameters) will change. The embodiments are able to utilize a peak detector to monitor the changes to these scattering parameters. FIG. 13 is illustrative.

FIG. 13 shows how the signal changes in response to various different facial movements 1300. The scattering parameters 1305 capture the changes in signal. In FIG. 13, an RF sensor is disposed near the user's cheek region. As the cheek moves, the RF sensors detect this movement, and the scattering parameters are updated.

In FIG. 13, the signal is displayed in terms of femto-Farad. This was done simply for convenience purposes, and the RF sensor should not be confused with a traditional sensor used in capacitance touch devices. The disclosed embodiments are able to acquire the signal data and then feed that signal data to an AI model or an ML engine, such as ML engine 910 of FIG. 9. The ML engine is then trained as to what portion of the signal corresponds to what type of facial movement. This data can then be used to accurately determine facial movements from future signals.

By way of further explanation, the embodiments use RF sensors that characterize the scattering parameters of the circuit. The RF sensors can also be thought of as generating an impedance matrix.

With traditional capacitive sensors, these traditional sensors are actually looking at a matrix of capacitances between electrodes, called differential lines. For example, with a smart device having a touch screen, that touch screen includes multiple different lines of conductors that go over the screen, called drive and sense. When a finger comes in between those lines or closely approaches those lines, the capacitance between those lines in either part of the matrix will change and the device has a location of the touch or multi touch input. Notably, this type of touch screen is a completely closed system and does not rely on a ground.

The disclosed RF sensors, on the other hand, are not looking for capacitance; instead, the sensors are looking for a voltage at a certain frequency. The RF sensors are tuned to resonate when the user's body (e.g., the user's face) is at a very specific distance relative to the RF sensor. Furthermore, the disclosed system is grounded to the body because the HMD is a wearable device. In this regard, the user's body acts as a ground, which is in complete contrast with traditional touch screen devices. Traditional touch screen devices attempt to avoid a dependency on the ground because they are often used in multiple different scenarios and conditions (e.g., on top of a table, in a person's pocket, or in a person's hand). The disclosed embodiments, on the other hand, work on the user's body. For instance, the RF sensor can be disposed on a user's ring, wristband, or the HMD.

Another distinction between the disclosed RF sensors and a traditional touch screen device is that touch systems operate at a very specific, standardized frequency. The disclosed RF sensors, on the other hand, are free to operate at any frequency (e.g., 1 GHZ, 200 KHz, etc.). The embodiments select a frequency to use. Additionally, the embodiments can perform frequency hopping or spread spectrum, thereby enabling the embodiments to operate in proximity to any number of other devices without causing interference. This ability is available because the embodiments are performing peak detection, which is not frequency dependent. Once the signal information is passed from the analog domain to the digital domain, the embodiments can simply look at the amplitude and/or phase.

With regard to the scattering parameter values or impedance, those parameters have four dimensions. One dimension is capacitance or capacity. It is often the case that the dominant factor for this implementation is capacitance, which is why capacitance was used in the illustration of FIG. 13. Furthermore, operating in capacitive mode acts to lower the power because little or no current is flowing when the user is in the resting pose. That is, when the user is in the resting pose, no current is flowing in the circuit so the power consumption is practically zero. In this sense, capacitance in this particular application is the dominant factor of the scattering parameters, but essentially the embodiments are doing scattering parameter peak detection.

By way of more detail regarding the scattering parameters, the scattering parameter matrix is basically defined as the power coming out of a port divided by the power going into another port. If there is a single port, then there will be just a single scattering parameter, which is just S11 (e.g., the reflection coefficient of impedance between the source end and the load end). It is possible to convert S11 to impedance, so impedance has 4 values, one is capacitance, one is inductance, one is conductance, and the final one is resistance. These parameters can be viewed in the following way: series resistance, series inductance, parallel capacitance, and parallel conductance. In the disclosed embodiments, conductance, resistance, and inductance are typically negligible and they can be assumed to be zero just to simplify the calculation pipeline.

For the AI model, once the capacitance is known, it is possible to just assume that the other three scattering parameters are either zero or infinity. That is, it is possible to assume that conductance and inductance are zero and resistance is infinity. So it turns out that the embodiments are able to just work with a single capacitance for the purpose of synthesizing the signals.

The embodiments thus use the scattering parameters to generate a waveform which is primarily based on the capacitance. That waveform is then fed into an AI model, which translates or correlates the waveform to actual facial movements. The AI model is then able to output expression coefficients (e.g., perhaps about 220 coefficients), which can then be used to modify the image file mentioned earlier. In this sense, the embodiments can be thought of as performing a modification to a surface reconstruction image, and the embodiments are not performing emotion detection or expression detection.

The embodiments are able to change the image file element by element and vertex by vertex, resulting in an image that is fully customized to the specific user wearing the HMD. If a person smiles, the embodiments are able to display how the persons eyes, eyebrows, cheeks, and potentially even mouth change as a result of the smile in the outward-facing display. A different person's smile and face changes will be visualized in a different manner because the expression coefficients (e.g., coefficients 915A and 915B of FIG. 9) will be different for that person.

The RF sensors track and monitor conductive material, such as the salt water, blood, or muscle groups in the user's body. The RF sensors do not necessarily track the user's skin movement or stretching because skin is not a very conductive material. In this manner, the RF sensors are monitoring conductive material that is included in a person's body. The embodiments are able to generate a waveform based on the detected frequencies that are observed by the RF sensors. Stated differently, the RF sensors are designed to oscillate at a particular frequency. As the conductive material inside the user's body moves either closer or farther from the RF sensors, the resulting waveform generated by the RF sensors will be modified as discussed above. This change to the waveform can be correlated with the user's movement, thereby enabling the system to determine how the user moved.

The granularity by which the image file can be modified can be dependent on the number of RF sensors that are available. A larger number of RF sensors allows for more information to be collected, thereby resulting in a more specific tailoring or modification of the image file's coefficients. As a result, a more customizable image can be displayed on the outward-facing display.

Example Views

Figure 14:
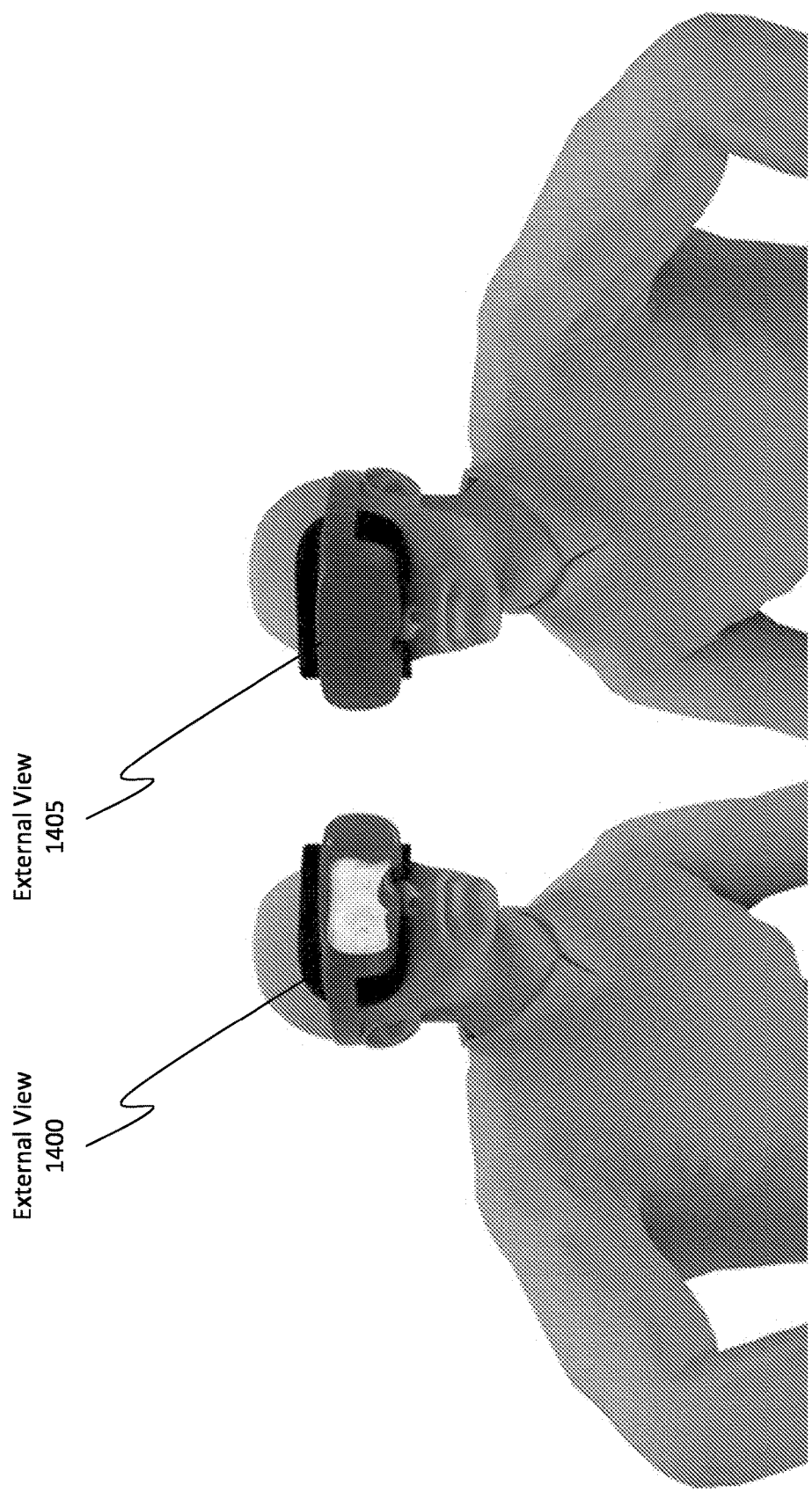
FIG. 14 illustrates how the outward-facing display can be turned on or off in response to certain conditions.

Attention will now be directed to FIG. 14, which illustrates two external views 1400 and 1405 of the outward-facing display. In this scenario, the outward-facing display includes a lenticular display; furthermore, the outward-facing display is visualizing an image of the user's face. That image will be modified based on the detected movements of the user's face, as detected by the RF sensors mentioned above.

The external view 1400 reflects a scenario where the outward-facing display is displaying content. This can occur, for example, when the HMD is displaying a pass through image for the user. In some cases, the outward-facing display may be configured to always display some content.

The external view 1405, on the other hand, reflects a scenario where the outward-facing display is no longer displaying content. For instance, it may be the case that the HMD is no longer displaying a pass through image for the user.

Figure 15:
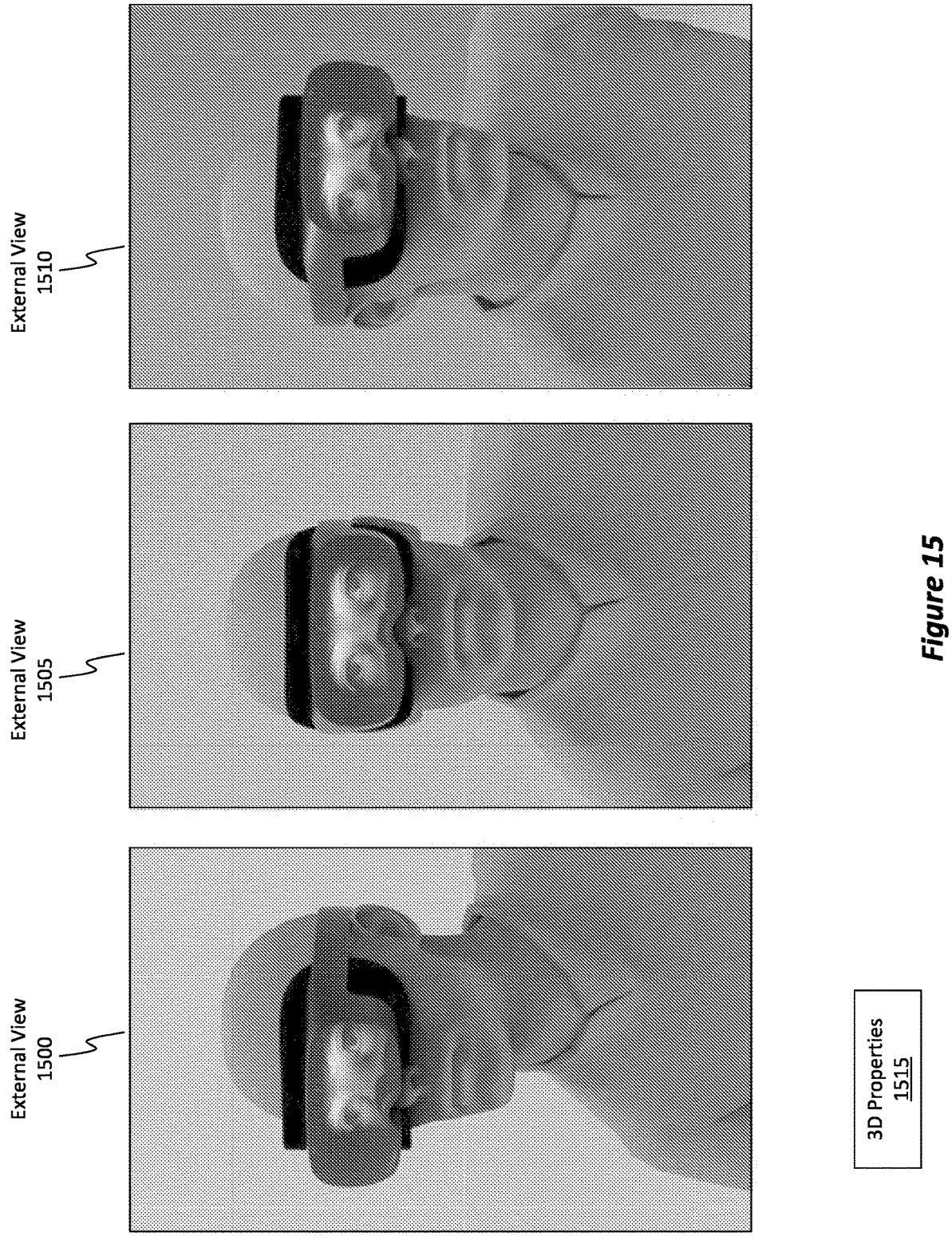
FIG. 15 illustrates how the outward-facing display can display content in a manner as if the displayed content has three-dimensional properties.

FIG. 15 shows three different perspective views of a lenticular display that is currently displaying detailed features of a user's face. FIG. 15 shows a first external view 1500, a second external view 1505, and a third external view 1510. Notice, the views all depict slightly different content because of how the pixels are being viewed from the different angles through the lenticular lenses. Also, notice how the displayed images are all displayed as having realistic 3D properties 1515, such as depth and contour to the user's face.

Figure 16:
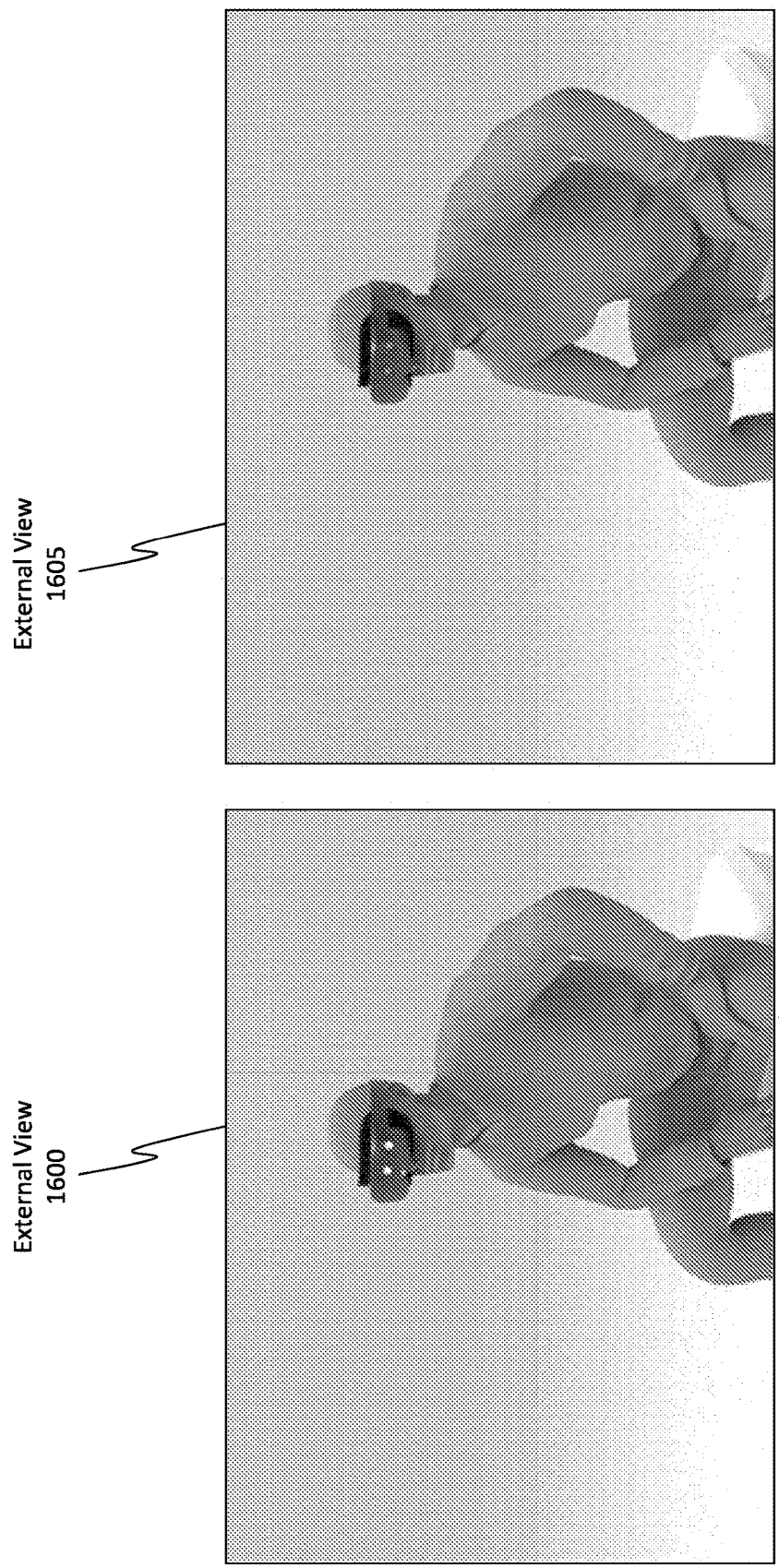
FIG. 16 illustrates how the outward-facing display can display content based on certain conditions, such as by displaying content brightly when a pass through image is displayed to the user and by displaying content dimly when a pass through image is not being displayed.

FIG. 16 shows a first external view 1600 and a second external view 1605. The first external view 1600 reflects a simplified depiction of the user's eyes and where they are directed. Notice, the brightness of the image is brighter in external view 1600 as compared to external view 1605. This may be the case based on certain detected conditions. For instance, the brightness and/or the amount of detail in the image may be increased when the HMD is displaying a pass through image. The brightness and/or detail level may be reduced when the HMD is not displaying a pass through image. Accordingly, the brightness and/or detail level of the image can be modified based on any number of detected conditions, including conditions related to the user, HMD, or even the environment.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Attention will now be directed to FIG. 17, which illustrates a flowchart of an example method 1700 for displaying outward-directed content on a head-mounted mixed-reality (MR) device that is wearable by a user. The MR device includes a user-facing display that displays user-directed content. Notably, the user-directed content is visible from a first position of a user who is wearing the MR device.

The MR device further includes an outward-facing display that displays outward-directed content. The outward-directed content is visible from a second position that is external relative to the position of the user who is wearing the MR device. Method 1700 can be implemented by the VR HMD 100 or the AR HMD 105 of FIG. 1 or any of the other MR systems disclosed herein. Optionally, method 1700 can be performed by the service 905 of FIG. 9.

Method 1700 includes an act (act 1705) of displaying user-directed content on a user-facing display of the MR device. As indicated earlier, the user-directed content is visible from a first position of a user who is wearing the MR device. The user-directed content is primarily aimed for viewing and/or interaction by the user who is wearing the MR device.

In parallel, in serial, or even asynchronously with act 1705, act 1710 includes displaying outward-directed content on an outward-facing display of the MR device. The outward-directed content is visible from a second position that is external relative to the position of the user who is wearing the MR device. The outward-directed content is primarily aimed for viewing and/or interaction by spectators.

In some cases, the user-directed content is visible only from the first position such that spectators are not able to view the user-directed content. In some cases, the outward-directed content is visible only from the second position such that the user is not able to view the outward-directed content. Optionally, the outward-directed content is displayed simultaneously with the user-directed content. In some cases, the outward-directed content is different than the user-directed content while in other cases the outward-directed content is the same or at least partially the same as the user-directed content. For instance, it may be the case that at least a portion of the outward-directed content is the same as a corresponding portion of the user-directed content.

In some implementations, the outward-directed content reflects a facial feature of the user. Optionally, the outward-directed content can reflect a movement of the facial feature of the user. As another option, the outward-directed content can be displayed in a manner so as to appear as having depth. In some embodiments, the outward-directed content is displayed in a manner so as to appear as being two-dimensional. The outward-directed content can include at least one of: a graphic, text, scene content corresponding to a scene that is being displayed by the user-facing display, or a facial feature of the user.

The outward-facing display can include a lenticular display. This display can include any number of pixel groups and corresponding lenticular lenses. That is, the lenticular display can include a plurality of lenticular lenses. For each lenticular lens, that lenticular lens can be associated with a matrix of pixels. In one example scenario, each matrix of pixels includes a 4×4 matrix of pixels.

The MR device can further include a radio frequency (RF) sensor. The RF sensor generates a set of scattering parameters that reflect a movement of conductive matter of the user. The conductive matter can, for example, be a muscle group of the user, salt water inside the user, or even potentially the user's blood.

In some implementations, method 1700 can include an act of accessing an image file that represents a face of the user. The image file can include a set of coefficients that, if modified, changes an appearance of the user's face as represented by the image file. The method can further include an act of obtaining scattering parameter data from a radio frequency (RF) sensor disposed on the MR device. The RF sensor generates a set of scattering parameters that reflect a movement of conductive matter of the user, where the conductive matter is associated with the face of the user. The embodiments can use the scattering parameters to update the set of coefficients, resulting in a change to the appearance of the user's face as represented by the image file. After the set of coefficients are updated, the embodiments can display at least a portion of the image file on the outward-facing display.

Methods for Visualizing a User's Face

Figure 18:
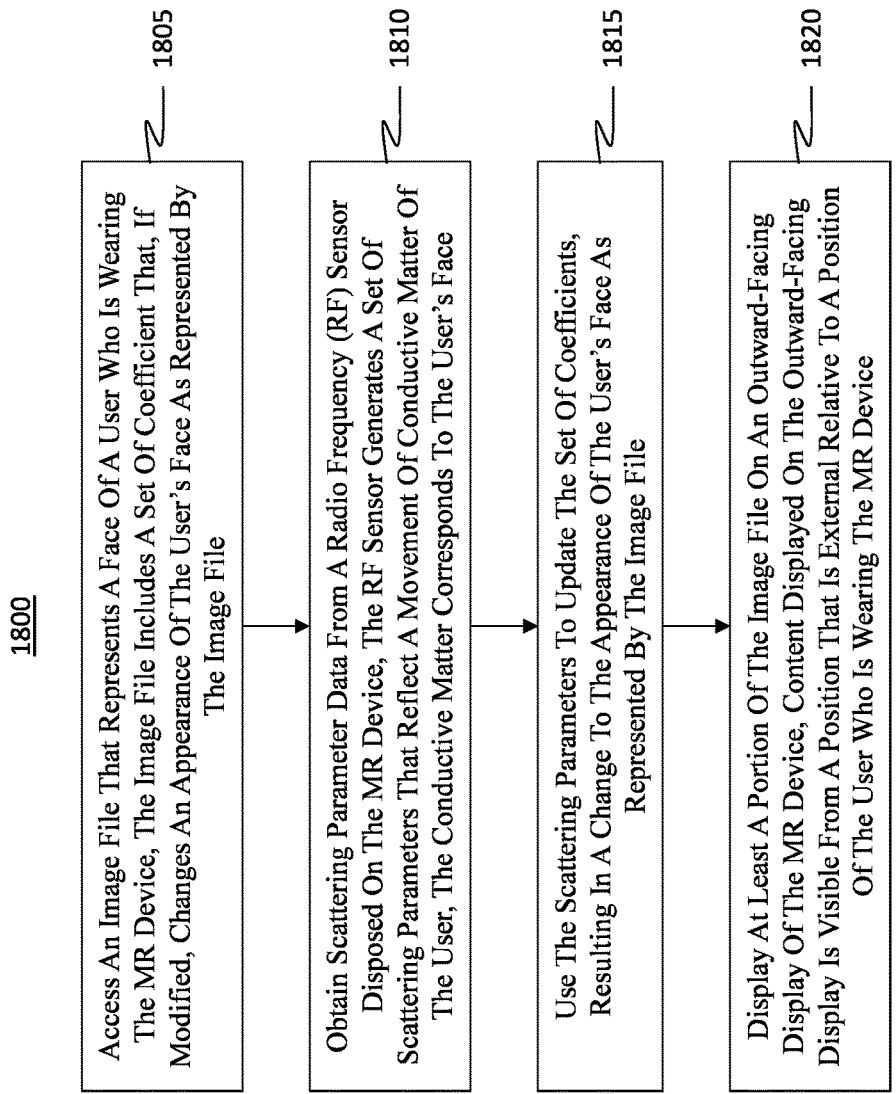
FIG. 18 illustrates another flowchart of an example method for using RF sensors to monitor a movement of a user's body part and to update an image file to reflect that movement.

FIG. 18 shows a flowchart of an example method 1800 for displaying outward-facing content on a head-mounted mixed-reality (MR) device. Method 1800 can also be implemented using the disclosed HMDs and the disclosed service 905 of FIG. 9.

Act 1805 includes accessing an image file that represents a face of a user who is wearing the MR device. The image file includes a set of coefficients that, if modified, changes an appearance of the user's face as represented by the image file.

Act 1810 includes obtaining scattering parameter data from a radio frequency (RF) sensor disposed on the MR device. The RF sensor generates a set of scattering parameters that reflect a movement of conductive matter of the user. The conductive matter corresponds to the user's face.

Act 1815 includes using the scattering parameters to update the set of coefficients, resulting in a change to the appearance of the user's face as represented by the image file. After the set of coefficients are updated, act 1820 includes displaying at least a portion of the image file on an outward-facing display of the MR device. Content displayed on the outward-facing display is visible from a position that is external relative to a position of the user who is wearing the MR device.

Optionally, the portion of the image file that is displayed on the outward-facing display is displayed when the MR device is displaying a passthrough image to the user. As another option, the portion of the image file that is displayed on the outward-facing display is displayed in a manner so as to appear as though the portion of the image file has three-dimensional properties. The displayed content can correspond to the user's eyes, eyebrows, a portion of his/her nose, and/or a portion of his/her cheeks. Other facial features can also be displayed.

Accordingly, the disclosed embodiments provide a unique outward-facing display on a wearable HMD. This outward-facing display can be configured to display any type of content. The content displayed on that outward-facing display is often intended for view by persons (i.e. spectators) that are not wearing the HMD. Doing so allows the spectators to still be able to connect with the user who is wearing the HMD even if the user's real eyes are not visible through the HMD.

Example Computer/Computer Systems

Figure 19:
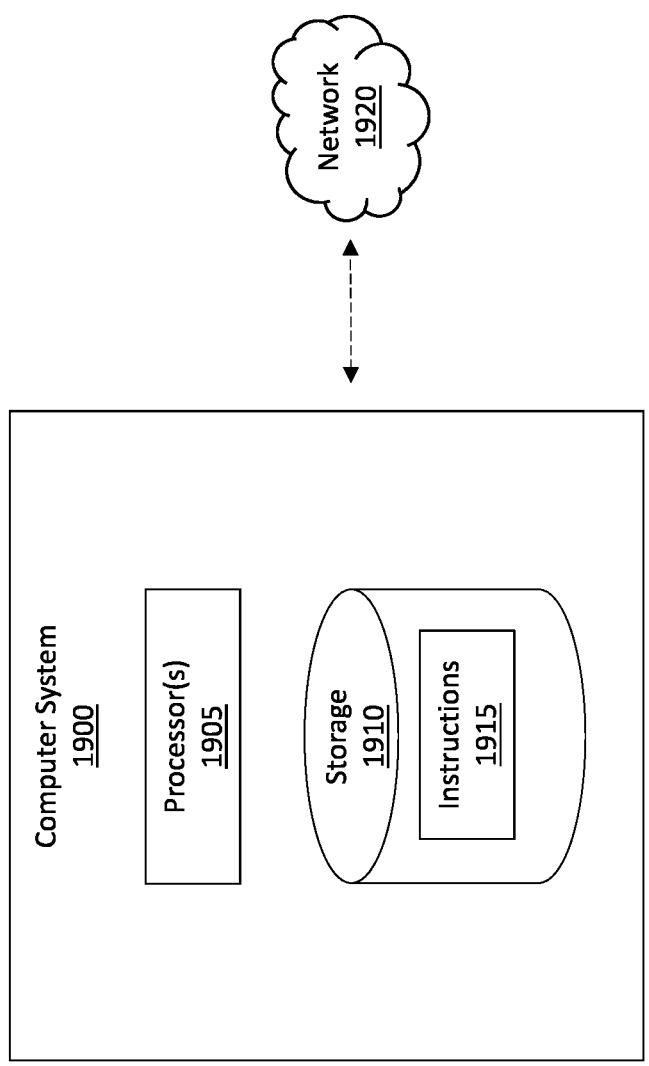
FIG. 19 illustrates an example computer system capable of performing any of the disclosed operations.

Attention will now be directed to FIG. 19 which illustrates an example computer system 1900 that may include and/or be used to perform any of the operations described herein. For instance, computer system 1900 can implement the service 905 of FIG. 9. Furthermore, the disclosed HMDs can be implemented in the form of computer system 1900.

Computer system 1900 may take various different forms. For example, computer system 1900 may be embodied as an HMD, a tablet, a desktop, a laptop, a mobile device, or a standalone device, such as those described throughout this disclosure. Computer system 1900 may also be a distributed system that includes one or more connected computing components/devices that are in communication with computer system 1900.

In its most basic configuration, computer system 1900 includes various different components. FIG. 19 shows that computer system 1900 includes one or more processor(s) 1905 (aka a "hardware processing unit") and storage 1910.

Regarding the processor(s) 1905, it will be appreciated that the functionality described herein can be performed, at least in part, by one or more hardware logic components (e.g., the processor(s) 1905). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1900. The different components, modules, engines, and services described herein may be implemented as objects or processors that execute on computer system 1900 (e.g. as separate threads).

Storage 1910 may be physical system memory, which may be volatile, non-volatile, or some combination of the two. The term "memory" may also be used herein to refer to non-volatile mass storage such as physical storage media. If computer system 1900 is distributed, the processing, memory, and/or storage capability may be distributed as well.

Storage 1910 is shown as including executable instructions 1915. The executable instructions 1915 represent instructions that are executable by the processor(s) 1905 of computer system 1900 to perform the disclosed operations, such as those described in the various methods.

The disclosed embodiments may comprise or utilize a special-purpose or general-purpose computer including computer hardware, such as, for example, one or more processors (such as processor(s) 1905) and system memory (such as storage 1910), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1900 may also be connected (via a wired or wireless connection) to external sensors (e.g., one or more remote cameras) or devices via a network 1920. For example, computer system 1900 can communicate with any number devices or cloud services to obtain or process data. In some cases, network 1920 may itself be a cloud network. Furthermore, computer system 1900 may also be connected through one or more wired or wireless networks to remote/separate computer systems(s) that are configured to perform any of the processing described with regard to computer system 1900.

A "network," like network 1920, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1900 will include one or more communication channels that are used to communicate with the network 1920. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A head-mounted mixed-reality (MR) device that is wearable by a user, said MR device comprising:
    a user-facing display that displays user-directed content, wherein the user-directed content is visible from a first position of a user who is wearing the MR device;
    a radio frequency (RF) sensor that obtains scattering parameter data, wherein the RF sensor generates a set of scattering parameters that reflect a movement of conductive matter of the user; and
    an outward-facing display that displays outward-directed content, wherein:
        the outward-directed content is visible from a second position that is external relative to the position of the user who is wearing the MR device,
        the outward-directed content is based on an image file that represents a face of the user,
        the image file includes a set of coefficients that, if modified, changes an appearance of the user's face as represented by the image file,
        the scattering parameters are used to update the set of coefficients, resulting in the changes to the appearance of the user's face as represented by the image file, and updating the set of coefficients is further based on the movement of the conductive matter of the user, the conductive matter corresponding to the user's face, and
        after the set of coefficients are updated, at least a portion of the image file is displayed on the outward-facing display.

2. The MR device of claim 1, wherein the user-directed content is visible only from the first position.

3. The MR device of claim 1, wherein the outward-directed content is visible only from the second position.

4. The MR device of claim 1, wherein the outward-directed content is displayed simultaneously with the user-directed content.

5. The MR device of claim 1, wherein the outward-directed content is different than the user-directed content.

6. The MR device of claim 1, wherein at least a portion of the outward-directed content is the same as a corresponding portion of the user-directed content.

7. The MR device of claim 1, wherein the outward-facing display includes a lenticular display.

8. The MR device of claim 1, wherein the outward-directed content reflects a facial feature of the user.

9. The MR device of claim 8, wherein the outward-directed content reflects a movement of the facial feature of the user.

10. The MR device of claim 1, wherein the outward-directed content is displayed in a manner so as to appear as having depth.

11. The MR device of claim 1, wherein the outward-directed content is displayed in a manner so as to appear as being two-dimensional.

12. The MR device of claim 1, wherein the outward-directed content includes at least one of: a graphic, text, scene content corresponding to a scene that is being displayed by the user-facing display, or a facial feature of the user.

13. The MR device of claim 1, wherein the outward-facing display includes a lenticular display that includes a plurality of lenticular lenses, and wherein, for each lenticular lens included in the plurality of lenticular lenses, each said lenticular lens is associated with a matrix of pixels.

14. The MR device of claim 13, wherein each matrix of pixels includes a 4×4 matrix of pixels.

15. A method for displaying outward-directed content on a head-mounted mixed-reality (MR) device, said method comprising:
    displaying user-directed content on a user-facing display of the MR device, wherein the user-directed content is visible from a first position of a user who is wearing the MR device;
    obtaining scattering parameter data from a radio frequency (RF) sensor of the MR device, wherein the RF sensor generates a set of scattering parameters that reflect a movement of conductive matter of the user; and
    displaying outward-directed content on an outward-facing display of the MR device, wherein:
        the outward-directed content is visible from a second position that is external relative to the position of the user who is wearing the MR device,
        the outward-directed content is based on an image file that represents a face of the user,
        the image file includes a set of coefficients that, if modified, changes an appearance of the user's face as represented by the image file,
        the scattering parameters are used to update the set of coefficients, resulting in the changes to the appearance of the user's face as represented by the image file, and updating the set of coefficients is further based on the movement of the conductive matter of the user, the conductive matter corresponding to the user's face; and
    after the set of coefficients are updated, displaying at least a portion of the image file on the outward-facing display.

16. The method of claim 15, wherein the method further includes:
    prior to displaying the outward-directed content on the outward-facing display of the MR device, accessing the image file that represents the face of the user.

17. A method for displaying outward-facing content on a head-mounted mixed-reality (MR) device, said method comprising:
    accessing an image file that represents a face of a user who is wearing the MR device, wherein the image file includes a set of coefficients that, if modified, changes an appearance of the user's face as represented by the image file;
    obtaining scattering parameter data from a radio frequency (RF) sensor disposed on the MR device, wherein the RF sensor generates a set of scattering parameters that reflect a movement of conductive matter of the user, wherein the conductive matter corresponds to the user's face;
    using the scattering parameters to update the set of coefficients, resulting in a change to the appearance of the user's face as represented by the image file; and
    after the set of coefficients are updated, displaying at least a portion of the image file on an outward-facing display of the MR device, wherein content displayed on the outward-facing display is visible from a position that is external relative to a position of the user who is wearing the MR device.

18. The method of claim 17, wherein the portion of the image file that is displayed on the outward-facing display is displayed when the MR device is displaying a passthrough image to the user.

19. The method of claim 17, wherein the portion of the image file that is displayed on the outward-facing display is displayed in a manner so as to appear as though the portion of the image file has three-dimensional properties.

\* \* \* \* \*